US012417745B2

(12) United States Patent
Bong et al.

(10) Patent No.: US 12,417,745 B2
(45) Date of Patent: Sep. 16, 2025

(54) DISPLAY DEVICE HAVING GATE DRIVER

(71) Applicant: LG Display Co., Ltd., Seoul (KR)

(72) Inventors: Jun Ho Bong, Paju-si (KR); Jae Young Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/423,508

(22) Filed: Jan. 26, 2024

(65) Prior Publication Data

US 2024/0257763 A1 Aug. 1, 2024

(30) Foreign Application Priority Data

Jan. 26, 2023 (KR) ........................ 10-2023-0010280

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2300/0861* (2013.01); *G09G 2310/0291* (2013.01); *G09G 2310/08* (2013.01); *G09G 2320/045* (2013.01); *G09G 2330/021* (2013.01)

(58) Field of Classification Search
CPC ............... G09G 3/3266; G09G 3/3233; G09G 2300/0861; G09G 2300/0819; G09G 2300/0842; G09G 2310/0291; G09G 2310/08; G09G 2320/045; G09G 2330/021
USPC ............................................ 345/213, 80, 98
See application file for complete search history.

(56) References Cited

U.S. PATENT DOCUMENTS 7,907,113 B2 * 3/2011 Jang ..................... G09G 3/3607 377/64
11,869,442 B2 * 1/2024 Ji ......................... G09G 3/3266

* cited by examiner

*Primary Examiner* — Jimmy H Nguyen
(74) *Attorney, Agent, or Firm* — Morgan, Lewis & Bockius LLP

(57) ABSTRACT

A display device including a gate driver capable of preventing threshold voltage shift of thin film transistors constituting the gate driver from influencing an output of the gate driver is disclosed. The display device includes a display panel including a plurality of gate lines and a plurality of data lines, and a gate driver including at least one scan driver. The gate driver sequentially outputs a scan signal to the plurality of gate lines. The at least one scan driver includes an output buffer configured to output a first clock signal as a scan signal in response to signals of a Q-node and a QB-node, and a first transistor configured to supply a low-level voltage to the QB-node in response to a start signal or a scan signal of an upstream stage.

8 Claims, 20 Drawing Sheets

FIG. 11
Ref
Vth + 3.2V
Vth + 3.3V
Vth + 3.4V
Vth + 3.5V
Vth + 3.6V
Vth + 3.7V

FIG. 15
GVST
CLK1
CLK2
Q Node
QB Node
SRO

DISPLAY DEVICE HAVING GATE DRIVER

This application claims the benefit of and priority from Korean Patent Application No. 10-2023-0010280, filed on Jan. 26, 2023, which is hereby incorporated by reference as if fully set forth herein.

BACKGROUND

Technical Field

The present disclosure relates to a display device including a gate driver.

Discussion of the Related Art

A display device includes a panel configured to display an image through pixels disposed in the form of a matrix at intersections of a plurality of gate lines and a plurality of data lines, and a driving circuit configured to drive the panel. Each pixel is independently driven by a thin film transistor (TFT).

The driving circuit includes a gate driver and a data driver. The gate driver sequentially drives the plurality of gate lines, and the data driver supplies a data voltage to the plurality of data lines.

The gate driver may be formed at the display panel, together with thin film transistors of the pixels. Such a configuration is referred to as a "gate-in-panel (GIP) type."

The gate driver includes a plurality of stages configured to sequentially driving the plurality of gate lines.

Each stage includes a set node, a reset node, a node controller configured to control voltages of the set node and the reset node, and a buffer configured to output a scan signal to a corresponding one of the gate lines in accordance with voltages of the set node and the reset node. Each stage outputs one or two scan signals for one frame.

Meanwhile, the set node may not be transitioned to a gate-low voltage (VGL) at a time when the set node should be transitioned to the gate-low voltage (VGL), due to shift of threshold voltages of the thin film transistors constituting each stage. For this reason, each stage may output three or more scan signals (multi-scan signals) for one frame.

SUMMARY

Accordingly, the present disclosure is directed to a display device including a gate driver that substantially obviates one or more problems due to limitations and disadvantages of the related art.

An object of the present disclosure is to provide a display device including a gate driver capable of preventing threshold voltage shift of thin film transistors constituting the gate driver from influencing an output of the gate driver.

Objects of the present disclosure are not limited to the above-described objects, and other objects of the present disclosure not yet described will be more clearly understood by those skilled in the art from the following detailed description.

To achieve these objects and other advantages and in accordance with the purpose of the disclosure, as embodied and broadly described herein, a display device includes a display panel including a plurality of gate lines and a plurality of data lines, and a gate driver including at least one scan driver, the gate driver being configured to sequentially output a scan signal to the plurality of gate lines, wherein the at least one scan driver includes an output buffer configured to output a first clock signal as a scan signal in response to signals of a Q-node and a QB-node, and a first transistor configured to supply a low-level voltage to the QB-node in response to a start signal or a scan signal of an upstream stage.

In another aspect of the present disclosure, a display device includes a display panel including a plurality of gate lines and a plurality of data lines, and a gate driver comprising at least one scan driver, the gate driver being configured to sequentially output a scan signal to the plurality of gate lines, wherein the at least one scan driver includes an output buffer configured to output a first clock signal as a scan signal in response to signals of a Q-node and a QB-node, a first transistor configured to supply a low-level voltage to the QB-node in response to a start signal or a scan signal of an upstream stage, and a first capacitor coupled between the QB-node and a supply line for the start signal or the scan signal of the upstream stage.

In another aspect of the present disclosure, a display device includes a display panel including a plurality of gate lines and a plurality of data lines, and a gate driver including at least one scan driver, the gate driver being configured to sequentially output a scan signal to the plurality of gate lines, wherein the at least one scan driver includes an output buffer configured to output a first clock signal as a scan signal in response to signals of a Q-node and a QB-node, and a first transistor configured to supply a low-level voltage to the Q-node in response to a second clock signal.

It is to be understood that both the foregoing general description and the following detailed description of the present disclosure are by way of example and explanatory and are intended to provide further explanation of the present disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and along with the description serve to explain the principle of the disclosure. In the drawings.

DETAILED DESCRIPTION

Figure 1:
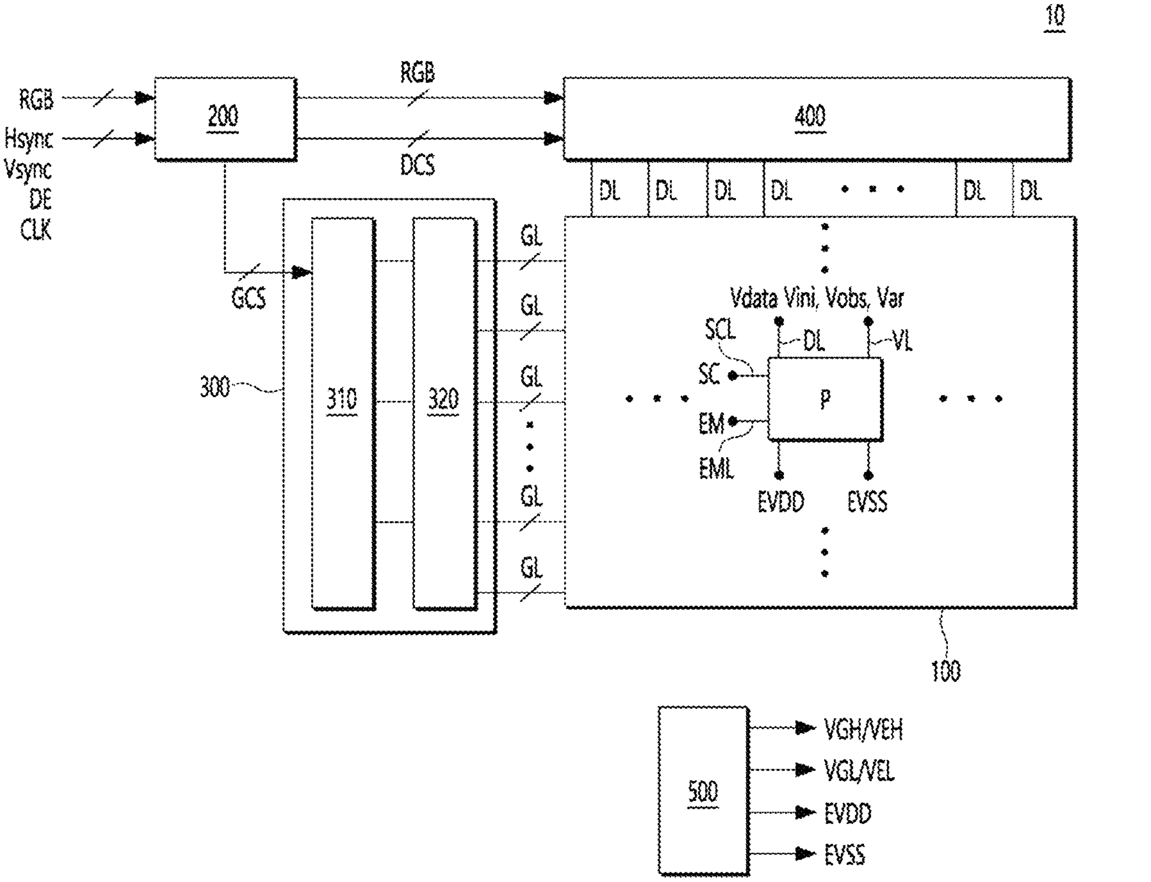
FIG. 1 is a block diagram briefly showing a configuration of a display device according to an embodiment of the present disclosure.

Hereinafter, a display apparatus according to an embodiment of the present disclosure will be described in detail with reference to the accompanying drawings. Throughout the present disclosure, the same drawing reference numerals should be understood to refer to the same constituent elements. In the following description, when a detailed description of well-known functions or configurations related to the present disclosure is determined to unnecessarily cloud a gist of the inventive concept, the detailed description thereof will be omitted.

FIG. 1 is a block diagram briefly showing a configuration of a display device according to an embodiment of the present disclosure.

As illustrated in FIG. 1, the display device according to an embodiment of the present disclosure, which is designated by reference numeral "10", includes a display panel 100 including a plurality of pixels P, a controller 200, a gate driver 300 configured to supply a gate signal to each of the plurality of pixels P, a data driver 400 configured to supply a data signal (or a data voltage) to each of the plurality of pixels P, and a power supply 500 configured to supply electric power to each of the plurality of pixels P, for driving of each of the plurality of pixels P.

The display panel 100 includes an active area AA (cf. FIG. 2) in which the pixels P are disposed, and a non-active area NA (cf. FIG. 2) disposed to surround the display area AA. In the non-active area NA, the gate driver 300 and the data driver 440 are disposed.

A plurality of gate lines GL and a plurality of data lines DL intersect each other at the display panel 100, and each of the plurality of pixels P is connected to corresponding ones of the gate lines GL and the data lines DL. In detail, each pixel P receives a gate signal from the gate driver 300 through the corresponding gate line GL, receives a data signal from the data driver 400 through the corresponding data line DL, and receives a high-level drive voltage EVDD and a low-level drive voltage EVSS from the power supply 500.

Each gate line GL supplies a scan signal SC and an emission control signal EM to a plurality of pixels P, and each data line DL supplies a data voltage Vdata to a plurality of pixels P. In accordance with various embodiments, each gate line GL may include a plurality of scan lines SCL for supply of the scan signal SC, and a plurality of emission control signal lines EML for supply of the emission control signal EM. The plurality of pixels P may each receive a bias voltage Vobs and initialization voltages Var and Vini from a power line VL.

Figure 2:
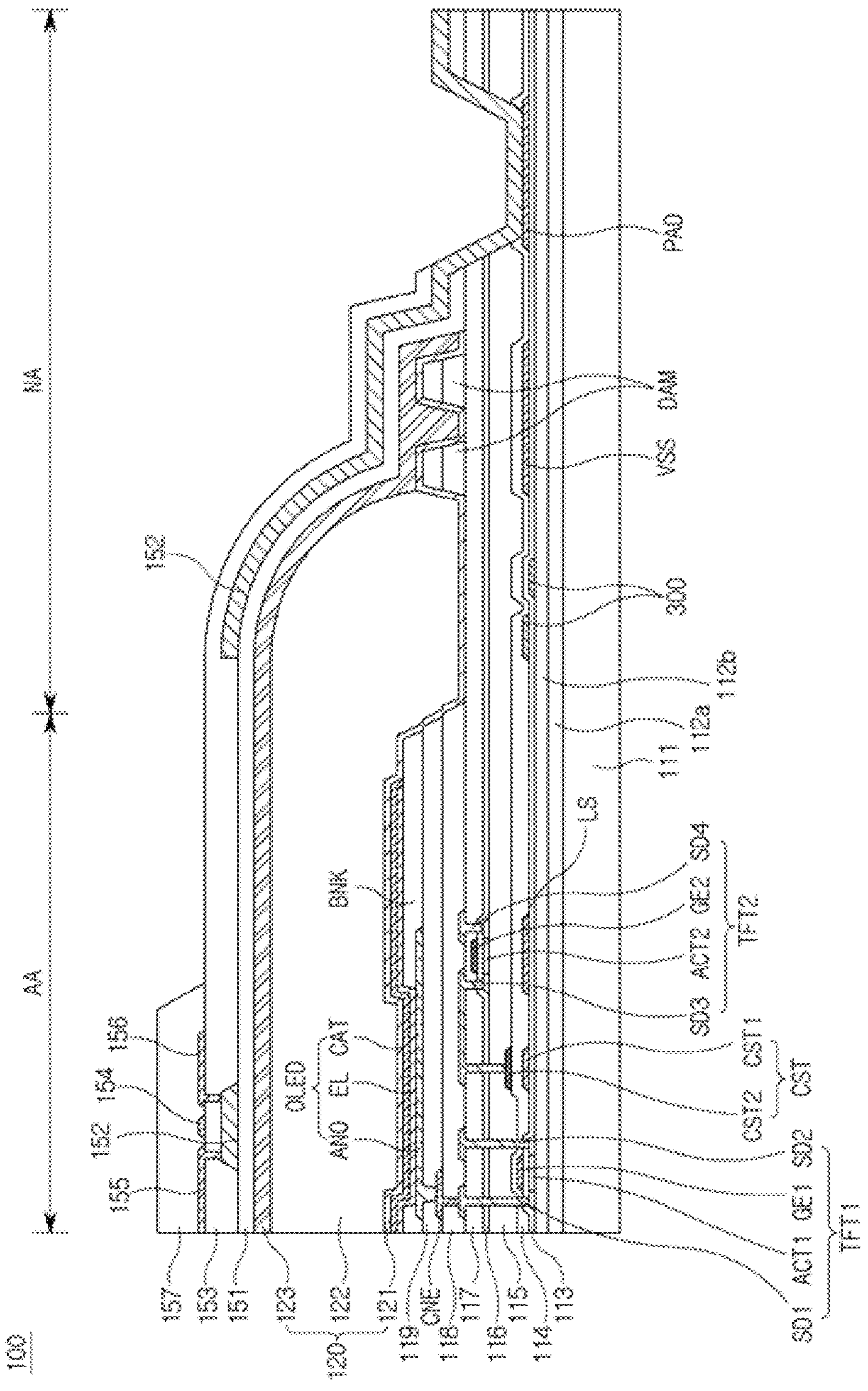
FIG. 2 is a sectional view showing a stack structure of a display device according to an embodiment of the present disclosure.

As shown in FIG. 2, each pixel P includes a light emitting element OLED, and a pixel circuit configured to control driving of the light emitting element OLED. The light emitting element OLED may include an anode ANO, a cathode CAT, and an emission layer EL between the anode ANO and the cathode CAT.

The pixel circuit may include a plurality of switching elements, a driving element, and a capacitor. The switching elements and the driving element may each be constituted by a thin film transistor. The driving element adjusts a light emission amount of the light emitting element OLED by controlling an amount of current supplied to the light emitting element OLED in accordance with a data voltage Vdata. The plurality of switching elements each is switched in accordance with a scan signal SC supplied thereto through a corresponding one of the plurality of scan lines SCL and an emission control signal EM supplied thereto through a corresponding one of the plurality of emission control lines EML.

The display panel 100 may be implemented as a non-transmissive display panel or a transmissive display panel. The transmissive display panel may be applied to a transparent display device in which an image is displayed on a screen and through which an actual background is visible. The display panel 100 may be implemented as a flexible display panel. The flexible display panel may be implemented as an OLED panel using a plastic substrate.

Each pixel P may be divided into a red pixel, a green pixel, and a blue pixel, for color rendering. Each pixel P may further include a white pixel. Each pixel P may include a pixel circuit.

Touch sensors may be disposed on the display panel 100. Touch input may be sensed using separate touch sensors or may be sensed through pixels P. The touch sensors may be disposed on a screen of the display panel 100 in an on-cell type or an add-on type or may be implemented as in-cell type touch sensors built in the display panel 100.

The controller 200 processes image data RGB input thereto from an outside thereof, to meet the size and resolution of the display panel 100, and then supplies the processed image data RGB to the data driver 400. The controller 200 generates a gate control signal GCS and a data control signal DCS using synchronization signals input from the outside thereof, for example, a dot clock signal CLK, a data enable signal DE, a horizontal synchronization signal Hsync, and a vertical synchronization signal Vsync. The controller 200 supplies the gate control signal GCS to the gate driver 300, thereby controlling an operation timing of the gate driver 300. The controller 200 supplies the data control signal DCS to the data driver 400, thereby controlling an operation timing of the data driver 400. The controller 200 synchronizes operation timings of the gate driver 300 and the data driver 400 using the gate control signal GCS and the data control signal DCS.

The controller 200 may be configured to be coupled with various processors, for example, a microprocessor, a mobile processor, an application processor, etc. in accordance with a device mounted therein.

A host system, which is applied to the controller 200, may be one of a television (TV) system, a set-top box, a navigation system, a personal computer (PC), a home theater system, a mobile appliance, a wearable appliance, and a vehicle system.

The controller 200 may multiply an input frame frequency by i times, thereby controlling the operation timings of the display panel drivers at a frame frequency corresponding to (an input frame frequency×i) Hz (i being a positive integer greater than 0). The input frame frequency is 60 Hz in a national television standards committee (NTSC) system and is 50 Hz in a phase-alternating line (PAL) system.

The controller 200 may drive each pixel P at various refresh rates. The controller 200 may drive each pixel P in a variable refresh rate (VRR) mode, in other words, to be switched between a first refresh rate and a second refresh rate. For example, the controller 200 may drive each pixel P at various refresh rates by simply varying a rate of a clock signal, generating a synchronization signal, for generation of a horizontal blank or a vertical blank, or driving the gate driver 300 in a mask manner.

The voltage level of the gate control signal GCS output from the controller 200 may be converted into a gate-on voltage VGL/VEL and a gate-off voltage VGH/VEH through a level shifter not shown, and the gate-on voltage VGL/VEL and the gate-off voltage VGH/VEH may then be supplied to the gate driver 300. The level shifter converts a low-level voltage of the gate control signal GCS into a gate-low voltage VGL and converts a high-level voltage of the gate control signal GCS into a gate-high voltage VGH. The gate control signal GCS includes a start pulse and a shift clock.

The gate driver 300 supplies a gate signal to each gate line GL in accordance with a gate control signal supplied from the controller 200. The gate driver 300 may be disposed at one side or both sides of the display panel 100 in a gate-in-panel manner.

The gate driver 300 sequentially outputs a gate signal to a plurality of gate lines GL under control of the controller 200. The gate driver 300 may shift the gate signal using a shift register and, as such, may sequentially supply shifted gate signals to the gate lines GL, respectively.

The gate signal may include a scan signal SC and an emission control signal EM in an organic light emitting display device. The scan signal SC includes a scan pulse swing between a gate-on voltage VGL and a gate-off voltage VGH. The emission control signal EM may include an emission control signal pulse swing between a gate-on voltage VEL and a gate-off voltage VEH. The scan pulse selects pixels P of a line on which a data voltage Vdata will be written. The emission control signal EM defines an emission time of the pixels P.

The gate driver 300 may include an emission control signal driver 310 and at least one scan driver 320.

The emission control signal driver 310 outputs an emission control signal pulse in response to a start pulse and a shift clock from the controller 200, and sequentially shifts the emission control signal pulse in accordance with the shift clock.

The at least one scan driver 320 outputs a scan pulse in response to the start pulse and the shift clock from the controller 200 and shifts the scan pulse in accordance with a timing of the shift clock.

The data driver 400 converts an image data RGB into a data voltage Vdata in accordance with a data control signal DCS supplied from the controller 200 and supplies the data voltage Vdata to the pixels P through the data lines DL.

Although the data driver 400 is shown in FIG. 1 as being disposed in the form of a single data driver at one side of the display panel 100, the number and position thereof are not limited to those shown in FIG. 1. That is, the data driver 400 may be constituted by a plurality of integrated circuits (ICs) and, as such, may be disposed at one side of the display panel 100 in a state of being divided into portions respectively corresponding to the plurality of ICs.

The power supply 500 generates DC power required for driving of the pixel array and the display panel drivers of the display panel 100, using a DC-DC converter. The DC-DC converter may include a charge pump, a regulator, a buck converter, a boost converter, etc. The power supply 500 may receive a DC input voltage from a host system not shown, thereby generating DC voltages such as a gate-on voltage VGL/VEL, a gate-off voltage VGH/VEH, a high-level drive voltage EVDD, a low-level drive voltage EVSS, etc. The gate-on voltage VGL/VEL and the gate-off voltage VGH/VEH are supplied to the level shifter (not shown) and the gate driver 300. The high-level drive voltage EVDD and the low-level drive voltage EVSS are supplied to the pixels P in common.

FIG. 2 is a sectional view showing a stack structure of a display device according to an embodiment of the present disclosure.

In FIG. 2, a cross-sectional structure including two switching thin film transistors TFT1 and TFT2 and one capacitor CST is shown. The two thin film transistors TFT1 and TFT2 include one thin film transistor of a switching thin film transistor or a driving transistor including a polycrystalline semiconductor material, and an oxide thin film transistor including an oxide semiconductor material. In this case, the thin film transistor including the polycrystalline semiconductor material is referred to as a "polycrystalline thin film transistor TFT1," and the thin film transistor including the oxide semiconductor material is referred to as an "oxide thin film transistor TFT2."

The polycrystalline thin film transistor TFT1 shown in FIG. 2 is an emission switching thin film transistor connected to a light emitting element OLED, and the oxide thin film transistor TFT2 is a switching thin film transistor connected to the capacitor CST.

One pixel P includes a light emitting element OLED, and a pixel driving circuit configured to apply drive current to the light emitting element OLED. The pixel driving circuit is disposed on a substrate 111, and the light emitting element OLED is disposed on the pixel driving circuit. In addition, an encapsulation layer 120 is disposed on the light emitting element OLED. The encapsulation layer 120 protects the light emitting element OLED.

The pixel driving circuit may be referred to as a "pixel (P) array" including a driving thin film transistor, a switching thin film transistor, and a capacitor. In addition, the light emitting element OLED may be referred to as an "array for light emission" including an anode, a cathode, and an emission layer disposed between the anode and the cathode.

In an embodiment, one driving thin film transistor and at least one switching thin film transistor use an oxide semiconductor as an active layer thereof. Thin film transistors using an oxide semiconductor material as an active layer thereof exhibit excellent leakage current blocking effects while being reduced in manufacturing costs, as compared to thin film transistors using a polycrystalline semiconductor material as an active layer thereof. Accordingly, the pixel driving circuit according to the embodiment includes the driving thin film transistor and the at least one switching thin film transistor which use an oxide semiconductor material, to reduce power consumption and manufacturing costs.

All of the thin film transistors constituting the pixel driving circuit may be implemented using an oxide semiconductor material, or only a part of the thin film transistors may be implemented using an oxide semiconductor material.

Of course, in the case of a thin film transistor using an oxide semiconductor material, it is difficult to secure reliability. On the other hand, in the case of a thin film transistor using a polycrystalline semiconductor material, an operation speed thereof is fast, and reliability thereof is excellent. In the embodiment, accordingly, the pixel driving circuit includes both the switching thin film transistor using the oxide semiconductor material and the switching thin film transistor using the polycrystalline semiconductor material.

The substrate 111 may be implemented to have a multilayer structure in which an organic layer and an inorganic layer are alternately stacked. For example, the substrate 111 may be constituted by an organic layer made of, for example, polyimide, and an inorganic layer made of, for example, silicon oxide ($SiO_2$), alternately stacked.

A lower buffer layer 112a is formed on the substrate 111. The lower buffer layer 112a is configured to block introduction of moisture or the like from an outside thereof. The lower buffer layer 112a may use a silicon oxide ($SiO_2$) layer stacked in plural. An auxiliary buffer layer 112b may be further disposed on the lower buffer layer 112a to protect a desired element from introduction of moisture.

The polycrystalline thin film transistor TFT1 is formed on the substrate 111. The polycrystalline thin film transistor TFT1 may use polycrystalline semiconductor as an active layer thereof. The polycrystalline thin film transistor TFT1 includes a first active layer ACT1 including a channel, through which electrons or holes move, a first gate electrode GE1, a first source electrode SD1, and a first drain electrode SD2.

The first active layer ACT1 includes a first channel region, a first source region disposed at one side of the first channel region, and a first drain region disposed at the other side of the first channel region. Accordingly, the first channel region is interposed between the first source region and the first drain region.

The first source region and the first drain region are regions treated to have conductivity through doping of group-V or III impurity ions such as phosphorous (P) or boron (B) ions in an intrinsic polycrystalline semiconductor material in a predetermined concentration. In the first channel region, the polycrystalline semiconductor material is maintained in an intrinsic state and, as such, the first channel region provides a path for movement of electrons and holes.

Meanwhile, the polycrystalline thin film transistor TFT1 includes the first gate electrode GE1 which overlaps with the first channel region of the first active layer ACT1. A first gate insulating layer 113 is disposed between the first gate electrode GEL and the first active layer ACT1. The first gate insulating layer 113 may use an inorganic layer such as a silicon oxide ($SiO_2$) layer, a silicon nitride ($SiN_x$) layer, or the like in the form of a single layer or multiple stacked layers.

In an embodiment, the polycrystalline thin film transistor TFT1 has a top-gate structure in which the first gate electrode GE1 is disposed over the first active layer ACT1. Accordingly, a first electrode CST1 included in the capacitor CST and a light shielding layer LS included in the oxide thin film transistor TFT2 may be formed using the same material as that of the first gate electrode GE1. In this case, the first gate electrode GE1, the first electrode CST1, and the light shielding layer LS may be formed through a single mask process and, as such, the number of mask processes may be reduced.

The first gate electrode GE1 may be made of a metal material. For example, the first gate electrode GE1 may be a single layer or multiple layers made of one of molybdenum (Mo), aluminum (Al), chromium (Cr), gold (Au), titanium (Ti), nickel (Ni), neodymium (Nd), and copper (Cu) or an alloy thereof, without being limited thereto.

A first interlayer insulating layer 114 is disposed on the first gate electrode GE1. The first interlayer insulating layer 114 may be implemented using silicon oxide ($SiO_2$), silicon nitride ($SiN_x$), or the like.

The display panel 100 may further include an upper buffer layer 115, a second gate insulating layer 116, and a second interlayer insulating layer 117 sequentially disposed over the first interlayer insulating layer 114. The polycrystalline thin film transistor TFT1 includes the first source electrode SD1 and the first drain electrode SD2 which are formed on the second interlayer insulating layer 117 and respectively connected to the first source region and the first drain region.

The first source electrode SD1 and the first drain electrode SD2 may be a single layer or multiple layers made of one of molybdenum (Mo), aluminum (Al), chromium (Cr), gold (Au), titanium (Ti), nickel (Ni), neodymium (Nd), and copper (Cu) or an alloy thereof, without being limited thereto.

The upper buffer layer 115 provides a base for forming a second active layer ACT2 of the oxide thin film transistor TFT2 implemented using an oxide semiconductor material while spacing the second active layer ACT2 apart from the first active layer ACT1 implemented using a polycrystalline semiconductor material.

The second gate insulating layer 116 covers the second active layer ACT2 of the oxide thin film transistor TFT2. The second gate insulating layer 116 is implemented using an inorganic layer because the second gate insulating layer 116 is formed over the second active layer AC2 implemented using an oxide semiconductor material. For example, the second gate insulating layer 116 may be made of silicon oxide ($SiO_2$), silicon nitride ($SiN_x$), or the like.

Meanwhile, the oxide thin film transistor TFT2 is formed on the upper buffer layer 115, and includes the second active layer ACT2, which is implemented using an oxide semiconductor material, a second gate electrode GE2 disposed on the second gate insulating layer 116, and a second source electrode SD3 and a second drain electrode SD4 disposed on the second interlayer insulating layer 117.

The second active layer ACT2 is implemented using an oxide semiconductor material, and includes a second channel region maintained to be intrinsic without being doped with impurities, and a second source region and a second drain region treated to have conductivity through doping with impurities.

The second gate electrode GE2 may be made of a metal material. For example, the second gate electrode GE2 may be a single layer or multiple layers made of one of molybdenum (Mo), aluminum (Al), chromium (Cr), gold (Au), titanium (Ti), nickel (Ni), neodymium (Nd), and copper (Cu) or an alloy thereof, without being limited thereto.

The oxide thin film transistor TFT2 further includes the light shielding layer LS which is disposed under the upper buffer layer 115 while overlapping with the second active layer ACT2. The light shielding layer LS blocks light incident upon the second active layer ACT2, thereby securing reliability of the oxide thin film transistor TFT2. The light shielding layer LS is made of the same material as that of the first gate electrode GE1 and may be formed at an upper surface of the first gate insulating layer 113. The light shielding layer LS may be electrically connected to the second gate electrode GE2, thereby constituting a dual gate.

The second source electrode SD3 and the second drain electrode SD4 are formed on the second interlayer insulating layer 117 simultaneously with the first source electrode SD1 and the first drain electrode SD2, using the same material as that of the first source electrode SD1 and the first drain electrode SD2. Accordingly, the number of mask processes may be reduced.

Meanwhile, a second electrode CST2 may be disposed on the first interlayer insulating layer 114 such that the second electrode CST2 overlaps with the first electrode CST1, thereby implementing the capacitor CST. For example, the second electrode CST2 may be a single layer or multiple layers made of one of molybdenum (Mo), aluminum (Al), chromium (Cr), gold (Au), titanium (Ti), nickel (Ni), neodymium (Nd), and copper (Cu) or an alloy thereof, without being limited thereto.

The capacitor CST supplies, to the light emitting element OLED, a data voltage applied thereto through a data line DL after storing the data voltage for a predetermined period. The capacitor CST includes two electrodes facing each other, and a dielectric disposed between the two electrodes. The first interlayer insulating layer 114 is disposed between the first electrode CST1 and the second electrode CST2.

The first electrode CST1 or the second electrode CST2 of the capacitor CST may be electrically connected to the second source electrode SD3 or the second drain electrode SD4 of the oxide thin film transistor TFT2. Of course, the connection relation of the capacitor CST may be varied in accordance with the pixel driving circuit, without being limited to the above-described connection relation.

Meanwhile, a first planarization layer 118 and a second planarization layer 119 are sequentially disposed over the pixel driving circuit to planarize an upper end of the pixel driving circuit. The first planarization layer 118 and the second planarization layer 110 may be an organic layer made of polyimide or acryl resin.

In addition, the light emitting element OLED is formed over the second planarization layer 119.

The light emitting element OLED includes an anode ANO, a cathode CAT, and an emission layer EL disposed between the anode ANO and the cathode CAT. When the pixel driving circuit is implemented to use a low-level voltage connected to the cathode CAT in common, the anode ANO is disposed as a separate electrode for each sub-pixel. On the other hand, when the pixel driving circuit is implemented to use a high-level voltage in common, the cathode CAT may be disposed as a separate electrode for each sub-pixel.

The light emitting element OLED is electrically connected to a driving element through an intermediate electrode CNE disposed on the first planarization layer 118. In detail, the anode ANO of the light emitting element OLED and the first source electrode SD1 of the polycrystalline thin film transistor TFT1 constituting the pixel driving circuit are interconnected by the intermediate electrode CNE.

The anode ANO is connected to the intermediate electrode CNE which is exposed through a contact hole extending through the second planarization layer 119. In addition, the intermediate electrode CNE is connected to the first source electrode SD1 which is exposed through a contact hole extending through the first planarization layer 118.

The intermediate electrode CNE functions as a medium for interconnecting the first source electrode SD1 and the anode ANO. The intermediate electrode CNE may be made of a conductive material such as copper (Cu), silver (Ag), molybdenum (Mo), or titanium (Ti).

The anode ANO may be formed to have a multilayer structure including a transparent conductive layer and an opaque conductive layer having high reflection efficiency. The transparent conductive layer is made of a material having a relatively great work function, for example, indium tin oxide (ITO) or indium zinc oxide (IZO). The opaque conductive layer may be formed to have a single-layer structure or a multilayer structure including aluminum (Al), silver (Ag), copper (Cu), lead (Pb), molybdenum (Mo), titanium (Ti) or an alloy thereof. For example, the anode ANO may be formed to have a structure in which a transparent conductive layer, an opaque conductive layer and a transparent conductive layer are sequentially stacked or a structure in which a transparent conductive layer and an opaque conductive layer are sequentially stacked.

The emission layer EL is formed through stacking of a hole-associated layer, an organic emission layer, and an electrode-associated layer in this order or in reverse order.

A bank layer BNK may be a pixel definition layer configured to expose the anode ANO of each pixel P. The bank BNK may be formed of an opaque material (for example, a black) to prevent light interference between adjacent pixels P. In this case, the bank layer BNK includes a light shielding material made of at least one of a color pigment, an organic black, and a carbon. A spacer 700 is further disposed on the bank layer BNK.

The cathode CAT is formed on an upper surface and a side surface of the emission layer EL while facing the anode ANO under the condition that the emission layer EL is interposed between the cathode CAT and the anode ANO. The cathode CAT may be integrally formed in the entirety of the active area AA. When the cathode CAT is applied to a top-emission type organic light emitting display device, the cathode CAT may be constituted by a transparent conductive layer made of, for example, indium tin oxide (ITO) or indium zinc oxide (IZO).

An encapsulation layer 120 configured to suppress moisture penetration may be further disposed on the cathode electrode CAT.

The encapsulation layer 120 may prevent penetration of ambient moisture or oxygen into the light emitting layer EL weak against ambient moisture or oxygen. For this function, the encapsulation layer 120 may include at least one inorganic encapsulation layer, and at least one organic encapsulation layer, without being limited thereto. The following description of the present disclosure will be given in conjunction with, for example, a structure of the encapsulation layer 120 in which a first encapsulation layer 121, a second encapsulation layer 122, and a third encapsulation layer 123 are sequentially stacked.

The first encapsulation layer 121 is formed on the substrate 111 formed with the cathode CAT. The third encapsulation layer 123 is formed on the substrate 111 formed with the second encapsulation layer 122, and may be formed to surround an upper surface, a lower surface, and a side surface of the second encapsulation layer 122, together with the first encapsulation layer 121. The first encapsulation layer 121 and the third encapsulation layer 123 as described above may minimize or prevent penetration of ambient moisture or oxygen into the light emitting element OLED. The first encapsulation layer 121 and the third encapsulation layer 123 may be made of an inorganic insulating material depositable at a low temperature such as silicon nitride ($SiN_x$), silicon oxide ($SiO_x$), silicon oxynitride (SiON), or aluminum oxide ($Al_2O_3$). Since the first encapsulation layer 121 and the third encapsulation layer 123 are deposited in a low-temperature atmosphere, it may be possible to prevent the light emitting element OLED weak against a high-temperature atmosphere from being damaged during a deposition process for the first encapsulation layer 121 and the third encapsulation layer 123.

The second encapsulation layer 122 performs a buffering function for alleviating stress generated between adjacent layers due to bending of the display device 10 and may planarize steps of adjacent layers. The second encapsulation layer 122 may be made of a non-photosensitive organic insulating material such as acryl resin, epoxy resin, phenolic resin, polyamide resin, polyethylene or silicon oxycarbide (SiOC), or a photosensitive organic insulating material such as photoacryl, without being limited thereto. When the second encapsulation layer 122 is formed through an inkjet method, a dam DAM may be disposed to prevent the second encapsulation layer 122, which is liquefied, from spreading to an edge of the substrate 111. The dam DAM may be disposed nearer to the edge of the substrate 111 than the second encapsulation layer 122. By virtue of the dam DAM as described above, it may be possible to prevent the second encapsulation layer 122 from spreading to a pad area disposed at an outermost portion of the substrate 111. In the pad area, conductive pads are disposed.

Although the dam DAM is designed to prevent spread of the second encapsulation layer 122, the second encapsulation layer 122, which is an organic layer, may be outwardly exposed when the second encapsulation layer 122 is formed to overflow the height of the dam DAM during a formation process thereof and, as such, moisture or the like may easily penetrate into an interior of the light emitting element. To this end, the dam DAM may be repeatedly formed in a number of at least 10 to prevent the above-described phenomenon.

The dam DAM may be disposed on the second interlayer insulating layer 117 in the non-active area NA.

In addition, the dam DAM may be formed simultaneously with the first planarization layer 118 and the second planarization layer 119. When the first planarization layer 118 is formed, a lower layer of the dam DAM is formed simultaneously with the first planarization layer 118, and when the second planarization layer 119 is formed, an upper layer of the dam DAM is formed simultaneously with the second planarization layer 119. Accordingly, the dam DAM may be formed to have a double stack structure.

Accordingly, the dam DAM may be configured using the same material as that of the first planarization layer 118 and the second planarization layer 119, without being limited thereto.

The dam DAM may be formed to overlap with a low-level drive power line VSS. For example, the low-level drive power line VSS may be formed at a layer under a region where the DAM is disposed, in the non-active area NA.

The low-level drive power line VSS and the gate driver 300 configured in a gate-in-panel type are formed to surround a periphery of the display panel. In this case, the low-level drive power line VSS may be disposed outwardly of the gate driver 300. In addition, the low-level drive power line VSS may be connected to the cathode CAT and, as such, may apply a common voltage to the cathode CAT. Although the gate driver 300 is simply shown in plan and cross-sectional views, the gate driver 300 may be configured using thin film transistors having the same structure as that of thin film transistors in the active area AA.

The low-level drive power line VSS is disposed outwardly of the gate driver 300. The low-level drive power line VSS surrounds the active area AA while being disposed outwardly of the gate driver 300. For example, the low-level drive power line VSS may be made of the same material as that of the first gate electrode GE1, without being limited thereto. For example, the low-level drive power line VSS may be made of the same material as that of the second electrode CST2 or the first source and drain electrodes SD1 and SD2, without being limited thereto.

In addition, the low-level drive power line VSS may be electrically connected to the cathode CAT. The low-level drive power line VSS may supply the low-level drive voltage EVSS to the plurality of pixels P in the active area AA.

A touch layer may be disposed on the encapsulation layer 120. In the touch layer, a touch buffer layer 151 may be disposed between a touch sensor metal, which includes touch electrode connection lines 152 and 154 and touch electrodes 155 and 156, and the cathode CAT of the light emitting element OLED.

The touch buffer layer 151 may prevent a chemical liquid (a developer, an etchant, etc.) used during a manufacturing process for the touch sensor metal disposed on the touch buffer layer 151, ambient moisture, or the like from penetrating into the emission layer EL. Accordingly, the touch buffer layer 151 may prevent damage to the emission layer EL weak against a chemical liquid or moisture.

The touch buffer layer 151 is made of an organic insulating material formable at a predetermined temperature (for example, a low temperature of 100° C. or less) while having a low dielectric constant of 1 to 3 to prevent damage to the emission layer EL including an organic material weak against high temperature. For example, the touch buffer layer 151 may be made of an acryl, epoxy, or siloxane-based material. The touch buffer layer 151, which is made of an organic insulating material while having planarization performance, may prevent damage to the encapsulation layer 120 and a breakage phenomenon of the touch sensor metal formed on the touch buffer layer 151 caused by bending of the display device which may be, for example, an organic light emitting display device.

In accordance with a mutual-capacitance-based touch sensor structure, the touch electrodes 155 and 156 are disposed on the touch buffer layer 151 while intersecting each other.

The touch electrode connection lines 152 and 154 may electrically interconnect the touch electrodes 155 and 156.

The touch electrode connection lines 152 and 154 and the touch electrodes 155 and 156 may be disposed at different layers, respectively, under the condition that a touch insulating layer 153 is interposed therebetween.

The touch electrode connection lines 152 and 154 are disposed to overlap with a bank layer 165, thereby preventing a reduction in aperture ratio.

Meanwhile, the touch electrodes 155 and 156 may be electrically connected to a touch driving circuit (not shown) via a touch pad PAD connected to a portion of the touch electrode connection line 152 extending along an upper and side surfaces of the encapsulation layer 120 and upper and side surfaces of the dam DAM.

The portion of the touch electrode connection line 152 may receive a touch drive signal from the touch driving circuit and may then transmit the touch drive signal to the touch electrodes 155 and 156. In addition, the portion of the touch electrode connection line 152 may transmit touch sensing signals from the touch electrodes 155 and 156 to the touch driving circuit.

A touch protection layer 157 may be disposed on the touch electrodes 155 and 156. Although the touch protection layer 157 is shown in FIG. 2 as being disposed only on the touch electrodes 155 and 156, the present disclosure is not limited thereto. For example, the touch protection layer 157 may further extend to a position near the dam DAM or beyond the dam DAM and, as such, may be disposed even on the touch electrode connection line 152.

In addition, a color filter (not shown) may further be disposed on the encapsulation layer 120. The color filter may be disposed on the touch layer or may be disposed between the encapsulation layer 120 and the touch layer.

Figure 3:
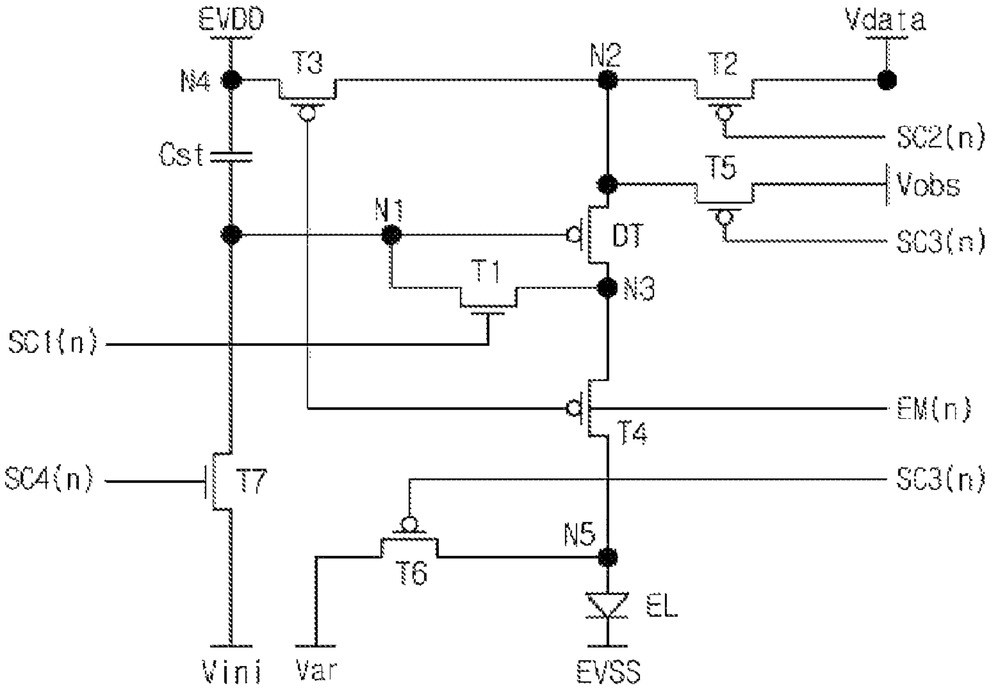
FIG. 3 is an equivalent circuit diagram of a sub-pixel in a display device according to an embodiment of the present disclosure.

FIG. 3 is an equivalent circuit diagram of a sub-pixel in a display device according to an embodiment of the present disclosure.

FIG. 3 only illustrates one pixel circuit. The pixel circuit of the present disclosure may include any structure so long as the structure may control light emission of a light emitting element EL in accordance with application of an emission signal EM(n) thereto. For example, the pixel circuit may include an additional scan signal, a switching transistor connected to the additional scan signal, and a switching transistor to which an additional initialization voltage is applied. Connection relations of the switching transistors and connection positions of a capacitor may be diverse.

As illustrated in FIG. 3, a plurality of pixels P may each include a pixel circuit including a driving transistor DT, and a light emitting element EL connected to the pixel circuit.

The pixel circuit may drive the light emitting element EL by controlling a drive current flowing through the light emitting element EL. The pixel circuit may include a driving transistor DT, first to seventh switching transistors T1 to T7, and a capacitor Cst. Each of the transistors DT and T1 to T7 may include a first electrode, a second electrode, and a gate electrode. One of the first and second electrodes may be a source electrode, and the other of the first and second electrodes may be a drain electrode.

Each of the transistors DT and T1 to T7 may be a P-type thin film transistor or an N-type thin film transistor. In the embodiment of FIG. 3, the first switching transistor T1 and the seventh switching transistor T7 are constituted by N-type thin film transistors, respectively, and the remaining transistors DT and T2 to T6 are constituted by P-type thin film transistors, respectively. Of course, the present disclosure is not limited to the above-described configurations, and all or a part of the transistors DT and T1 to T7 may be P-type thin film transistors or N-type thin film transistors. In addition, each of the N-type thin film transistors may be an oxide thin film transistor, and each of the P-type thin film transistors may be a polycrystalline silicon thin film transistor.

The following description will be given in conjunction with an example in which the first switching transistor T1 and the seventh switching transistor T7 are N-type thin film transistors, respectively, and the remaining transistors DT and T2 to T6 are P-type thin film transistors, respectively. Accordingly, the first switching transistor T1 and the seventh switching transistor T7 are turned on in response to a high voltage, whereas the remaining transistors DT and T2 to T6 are turned on in response to a low voltage.

In accordance with an example, among the first to seventh switching transistors T1 to T7 constituting the pixel circuit, the first switching transistor T1 may function as a compensation transistor, the second switching transistor T2 may function as a data supplying transistor, the third and fourth switching transistors T3 and T4 may function as emission control transistors, respectively, the fifth switching transistor T5 may function as a bias transistor, and the sixth and seventh switching transistors T6 and T7 may function as initialization transistors, respectively.

The light emitting element EL may include an anode and a cathode. The anode of the light emitting element EL may be connected to a fifth node N5, and the cathode of the light emitting element EL may be connected to a low-level drive voltage EVSS.

The driving transistor DT may include a first electrode connected to a second node N2, a second electrode connected to a third node N3, and a gate electrode connected to a first node N1. The driving transistor DT may supply, to the light emitting element EL, a drive current corresponding to a voltage of the first node N1 (or a data voltage Vdata stored in the capacitor Cst to be described later).

The first switching transistor T1 may include a first electrode connected to the first node N1, a second electrode connected to the third node N3, and a gate electrode configured to receive a first scan signal SC1(*n*). The first switching transistor T1 may be turned on in response to the first scan signal SC1(*n*) and, as such, may interconnect the first node N1 and the third node N3, thereby enabling the driving transistor DT to operate like a diode. Accordingly, a threshold voltage Vth of the driving transistor DT may be sampled by the first switching transistor T1. The first switching transistor T1 as described above may be a compensation transistor.

The capacitor Cst may be connected between the first node N1 and a fourth node N4. The capacitor Cst may store or sustain a high-level drive voltage EVDD.

The second switching transistor T2 may include a first electrode connected to a data line DL (or configured to receive the data voltage Vdata), a second electrode connected to the second node N2, and a gate electrode configured to receive a second scan signal SC2(*n*). The second switching transistor T2 may be turned on in response to the second scan signal SC2(*n*) and, as such, may transmit the data voltage Vdata to the second node N2. The second switching transistor T2 as described above may be a data supplying transistor.

The third switching transistor T3 and the fourth switching transistor T4 (or first and second emission controlling transistors) are connected between the high-level drive voltage EVDD and the light emitting element EL and, as such, may form a current movement path along which a drive current generated by the driving transistor DT moves.

The third switching transistor T3 may include a first electrode connected to the fourth node N4, thereby receiving the high-level drive voltage EVDD, a second electrode connected to the second node N2, and a gate electrode configured to receive an emission control signal EM(n).

The fourth switching transistor T4 may include a first electrode connected to the third node N3, a second electrode connected to the fifth node N5 (or the anode of the light emitting element EL), and a gate electrode configured to receive the emission control signal EM(n).

The third and fourth switching transistors T3 and T4 may be turned on in response to the emission control signal EM(n). In this state, a drive current is supplied to the light emitting element EL and, as such, the light emitting element EL may emit light at a luminance corresponding to the drive current.

The fifth switching transistor T5 may include a first electrode configured to receive a bias voltage Vobs, a second electrode connected to the second node N2, and a gate electrode configured to receive a third scan signal SC3(*n*). The fifth switching transistor T5 as described above may be a bias transistor.

The sixth switching transistor T6 may include a first electrode configured to receive a first initialization voltage Var, a second electrode connected to the fifth node N5, and a gate electrode configured to receive the third scan signal SC3(*n*).

The sixth switching transistor T6 may be turned on in response to the third scan signal SC3(*n*) before the light emitting element EL emits light (or after the light emitting element EL emits light). In this state, the sixth switching transistor T6 may initialize the anode (or a pixel electrode) of the light emitting element EL using the first initialization voltage Var. The light emitting element EL may have a parasitic capacitor formed between the anode and the cathode thereof. As the parasitic capacitor is charged during emission of the light emitting element EL, the anode of the light emitting element EL may have a specific voltage. Accordingly, it may be possible to initialize a charge amount accumulated in the light emitting element EL by applying the first initialization voltage Var to the anode of the light emitting element EL via the sixth switching transistor T6.

In the present disclosure, the gate electrodes of the fifth and sixth switching transistors T5 and T6 are configured to receive the third scan signal SC3(*n*) in common. However, the present disclosure is not limited to the above-described configuration. For example, the gate electrodes of the fifth and sixth switching transistors T5 and T6 may be configured to be independently controlled in accordance with separate scan signals, respectively.

The seventh switching transistor T7 may include a first electrode configured to receive a second initialization voltage Vini, a second electrode connected to the first node N1, and a gate electrode configured to receive a fourth scan signal SC4(*n*).

The seventh switching transistor T7 may be turned on in response to the fourth scan signal SC4(*n*) and, as such, may initialize the gate electrode of the driving transistor DT using the second initialization voltage Vini. An unnecessary charge may remain at the gate electrode of the driving transistor DT due to the high-level drive voltage EVDD stored in the capacitor Cst. Accordingly, it may be possible to initialize a residual charge by applying the second initialization voltage Vini to the gate electrode of the driving transistor DT via the seventh switching transistor T7.

Figure 4:
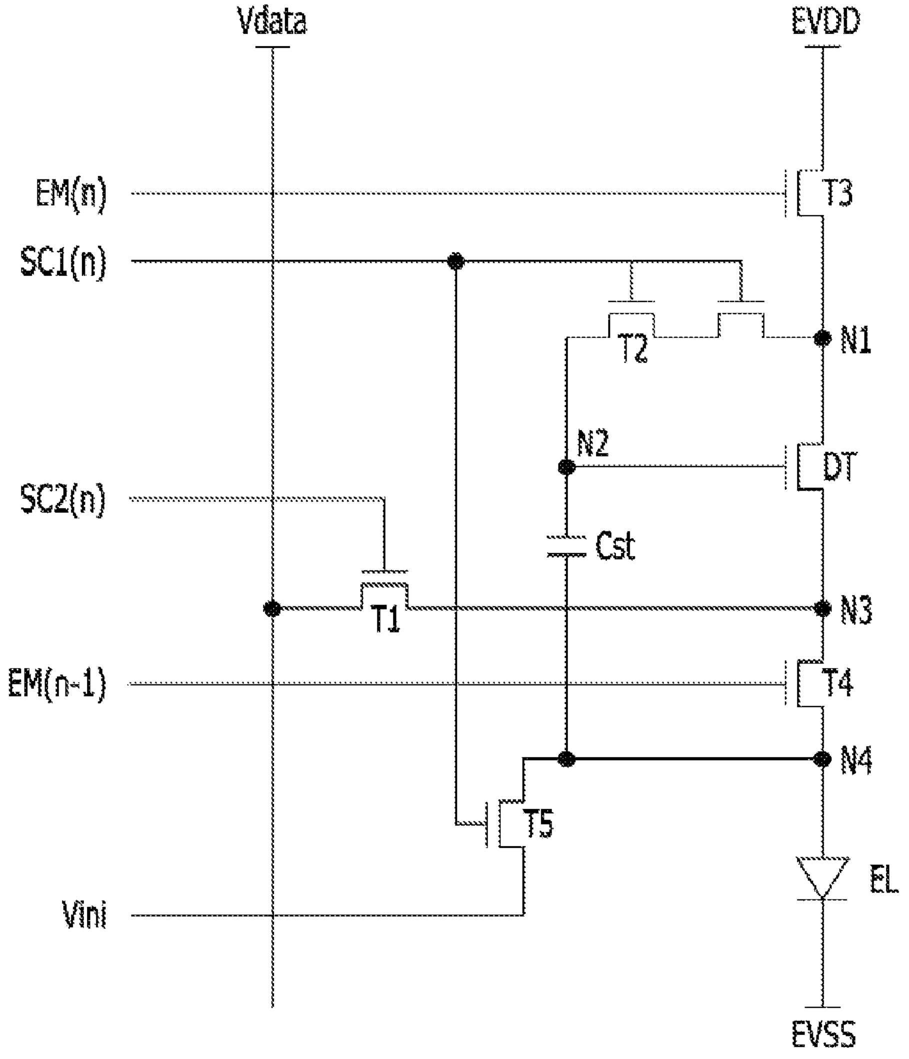
FIG. 4 is an equivalent circuit diagram of a sub-pixel in a display device according to another embodiment of the present disclosure.

FIG. 4 is an equivalent circuit diagram of a sub-pixel in a display device according to another embodiment of the present disclosure.

FIG. 4 only illustrates one pixel circuit. The pixel circuit of the present disclosure may include any structure so long as the structure may control light emission of a light emitting element EL in accordance with application of an emission signal EM(n) thereto. For example, the pixel circuit may include an additional scan signal, a switching transistor connected to the additional scan signal, and a switching transistor to which an additional initialization voltage is applied. Connection relations of the switching transistors and connection positions of a capacitor may be diverse.

As shown in FIG. 4, a plurality of pixels P may each include a pixel circuit including a driving transistor DT, and a light emitting element EL connected to the pixel circuit.

The pixel circuit may drive the light emitting element EL by controlling a drive current flowing through the light emitting element EL. The pixel circuit may include a driving transistor DT, first to fifth switching transistors T1 to T5, and a capacitor Cst. Each of the transistors DT and T1 to T5 may include a first electrode, a second electrode, and a gate electrode. One of the first and second electrodes may be a source electrode, and the other of the first and second electrodes may be a drain electrode.

Each of the transistors DT and T1 to T5 may be a P-type thin film transistor or an N-type thin film transistor. In the embodiment of FIG. 4, all of the transistors DT and T1 to T5 are constituted by N-type thin film transistors, respectively. Of course, the present disclosure is not limited to the above-described configurations, and all or a part of the transistors DT and T1 to T5 may be P-type thin film transistors. In addition, each of the N-type thin film transistors may be an oxide thin film transistor, and each of the P-type thin film transistors may be a polycrystalline silicon thin film transistor.

The following description will be given in conjunction with an example in which all of the transistors DT and T1 to T5 are N-type thin film transistors, respectively. Accordingly, all of the transistors DT and T1 to T5 are turned on in response to a high voltage.

In accordance with an example, among the first to fifth switching transistors T1 to T5 constituting the pixel circuit, the first switching transistor T1 may function as a data supplying transistor, the second switching transistor T2 may function as a compensation transistor, the third and fourth switching transistors T3 and T4 may function as emission control transistors, respectively, and the fifth switching transistor T5 may function as an initialization transistor.

The light emitting element EL may include an anode and a cathode. The anode of the light emitting element EL may be connected to a fourth node N4, and the cathode of the light emitting element EL may be connected to a low-level drive voltage EVSS.

The driving transistor DT may include a first electrode connected to a second node N2, a second electrode connected to a third node N3, and a gate electrode connected to a first node N1. The driving transistor DT may supply, to the light emitting element EL, a drive current corresponding to a voltage of the first node N1 (or a data voltage Vdata stored in the capacitor Cst to be described later).

The first switching transistor T1 may include a first electrode connected to the third node N3, a second electrode connected to a data line Vdata, and a gate electrode configured to receive a second scan signal SC2(*n*). The first switching transistor T1 may be turned on in response to the second scan signal SC2(*n*) and, as such, may transmit a data voltage Vdata to the third node N3. The first switching transistor T1 as described above may be a data supplying transistor.

The capacitor Cst may be connected between the second node N2 and the fourth node N4. The capacitor Cst may store or sustain the data voltage Vdata and a threshold voltage Vth of the driving transistor DT.

The second switching transistor T2 may include a first electrode connected to the first node N1, a second electrode connected to the second node N2, and a gate electrode configured to receive a first scan signal SC1(*n*). The second switching transistor T2 may be turned on in response to the first scan signal SC1(*n*) and, as such, may interconnect the first node N1 and the second node N2, thereby enabling the driving transistor DT to operate like a diode. Accordingly, the threshold voltage Vth of the driving transistor DT may be sampled by the second switching transistor T2. The second switching transistor T2 as described above may be a compensation transistor.

The third switching transistor T3 and the fourth switching transistor T4 (or first and second emission controlling transistors) are connected between a high-level drive voltage EVDD and the light emitting element EL and, as such, may form a current movement path along which a drive current generated by the driving transistor DT moves.

The third switching transistor T3 may include a first electrode configured to receive the high-level drive voltage EVDD, a second electrode connected to the second node N2, and a gate electrode configured to receive a first emission control signal EM(n).

The fourth switching transistor T4 may include a first electrode connected to the third node N3, a second electrode connected to the fourth node N4 (or the anode of the light emitting element EL), and a gate electrode configured to receive a second emission control signal EM(n−1).

The third and fourth switching transistors T3 and T4 may be turned on in response to the first and second emission control signals EM(n) and EM(n−1), respectively. In this state, a drive current is supplied to the light emitting element EL and, as such, the light emitting element EL may emit light at a luminance corresponding to the drive current.

The fifth switching transistor T5 may include a first electrode configure to receive an initialization voltage Vini, a second electrode connected to the fourth node N4, and a gate electrode configured to receive the first scan signal SC1(*n*).

The fifth switching transistor T5 may be turned on in response to the first scan signal SC1(*n*) before the light emitting element EL emits light (or after the light emitting element EL emits light). In this state, the fifth switching transistor T5 may initialize the anode (or a pixel electrode) of the light emitting element EL using the initialization voltage Vini. The light emitting element EL may have a parasitic capacitor formed between the anode and the cathode thereof. As the parasitic capacitor is charged during emission of the light emitting element EL, the anode of the light emitting element EL may have a specific voltage. Accordingly, it may be possible to initialize a charge amount accumulated in the light emitting element EL by applying the initialization voltage Vini to the anode of the light emitting element EL via the fifth switching transistor T5.

Figure 5:
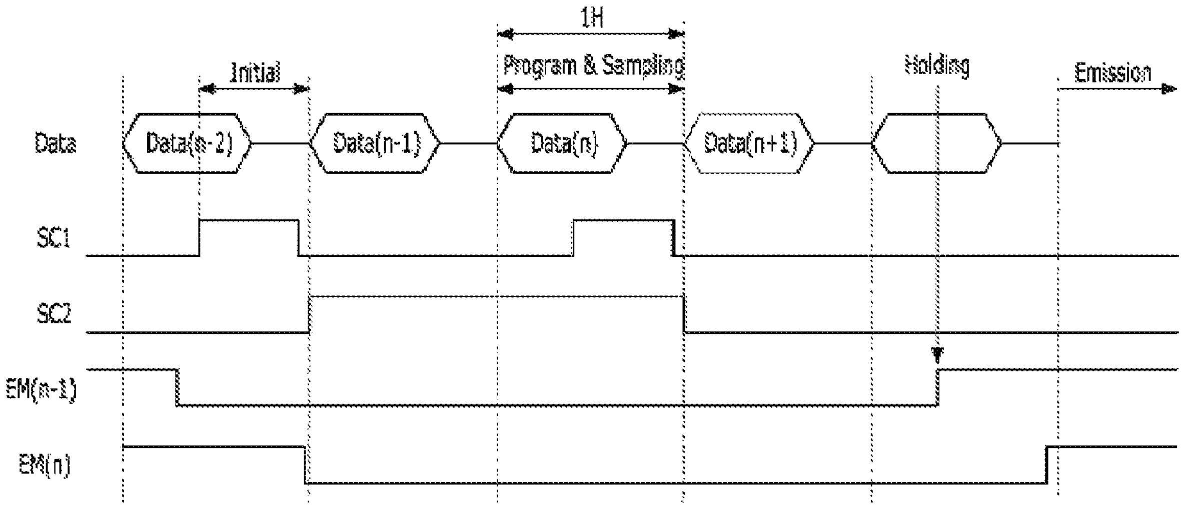
FIG. 5 is a timing diagram explaining operation procedures of the sub-pixel of FIG. 4 according to a scan signal and an emission control signal.

FIG. 5 is a timing diagram explaining operation procedures of the sub-pixel of FIG. 4 according to a scan signal and an emission control signal. FIGS. 6A to 6D are views explaining operations of transistors in the sub-pixel in an initialization period, a programming and sampling period, a holding period, and an emission period.

One frame may operate while including an initialization period Initial, a programming and sampling period Program & Sampling, a holding period Holding, and an emission period Emission. However, the present disclosure is not limited to the above-described order.

Figure 6A:
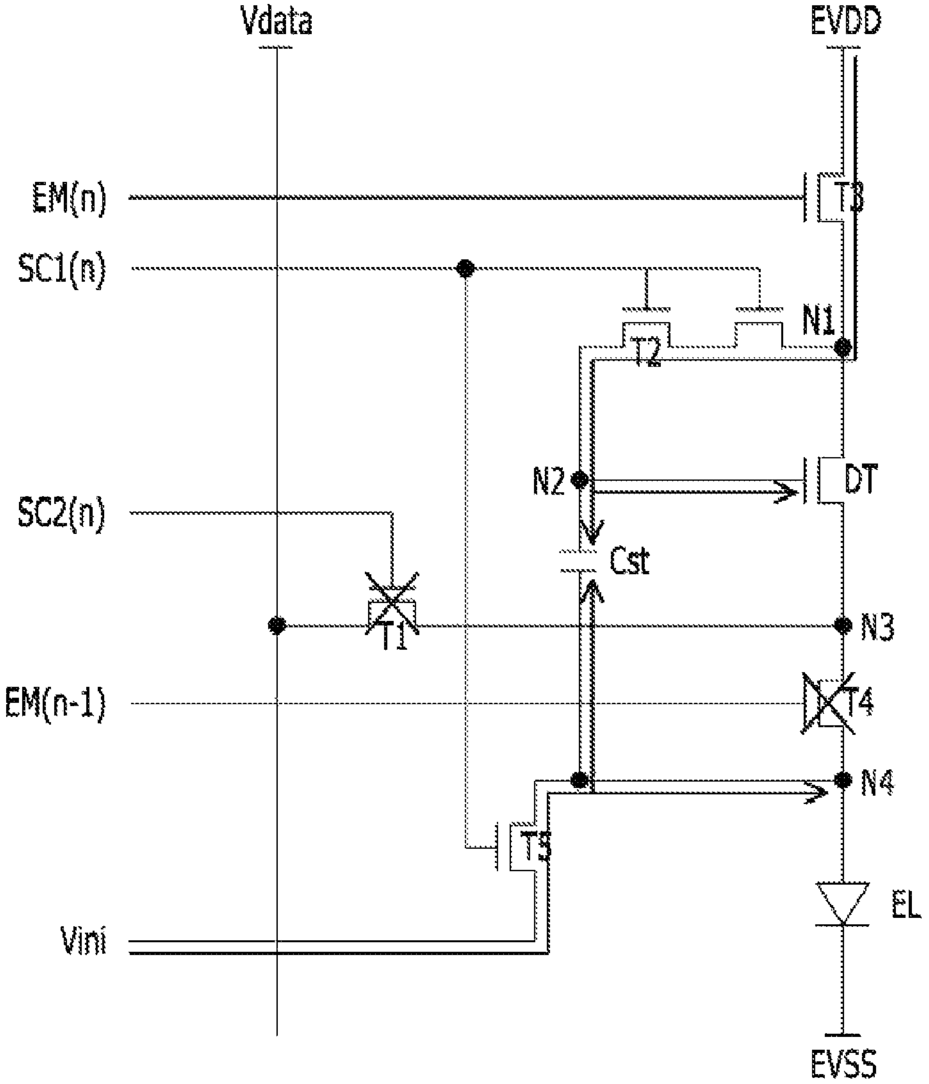
FIGS. 6A to 6D are views explaining operations of transistors in the sub-pixel in an initialization period, a programming and sampling period, a holding period, and an emission period.

As illustrated in FIG. 5 and FIG. 6A, the pixel circuit may operate while including the initialization period Initial.

The initialization period Initial is a period in which the anode (or the pixel electrode) of the light emitting element EL is initialized using the initialization voltage Vini before the light emitting element E1 emits light. In the initialization period Initial, the first scan signal SC1(*n*) and the first emission control signal EM(n) are high voltages, and the second scan signal SC2(*n*) and the second emission control signal EM(n−1) are low voltages. Accordingly, the first and fourth switching transistors T1 to T4 are turned off, and the second, third, and fifth switching transistors T2, T3, and T5 are turned on.

Accordingly, the initialization voltage Vini initializes the anode of the light emitting element EL, and the high-level drive voltage EVDD is applied to the first node N1 and the second node N2.

Figure 6B:
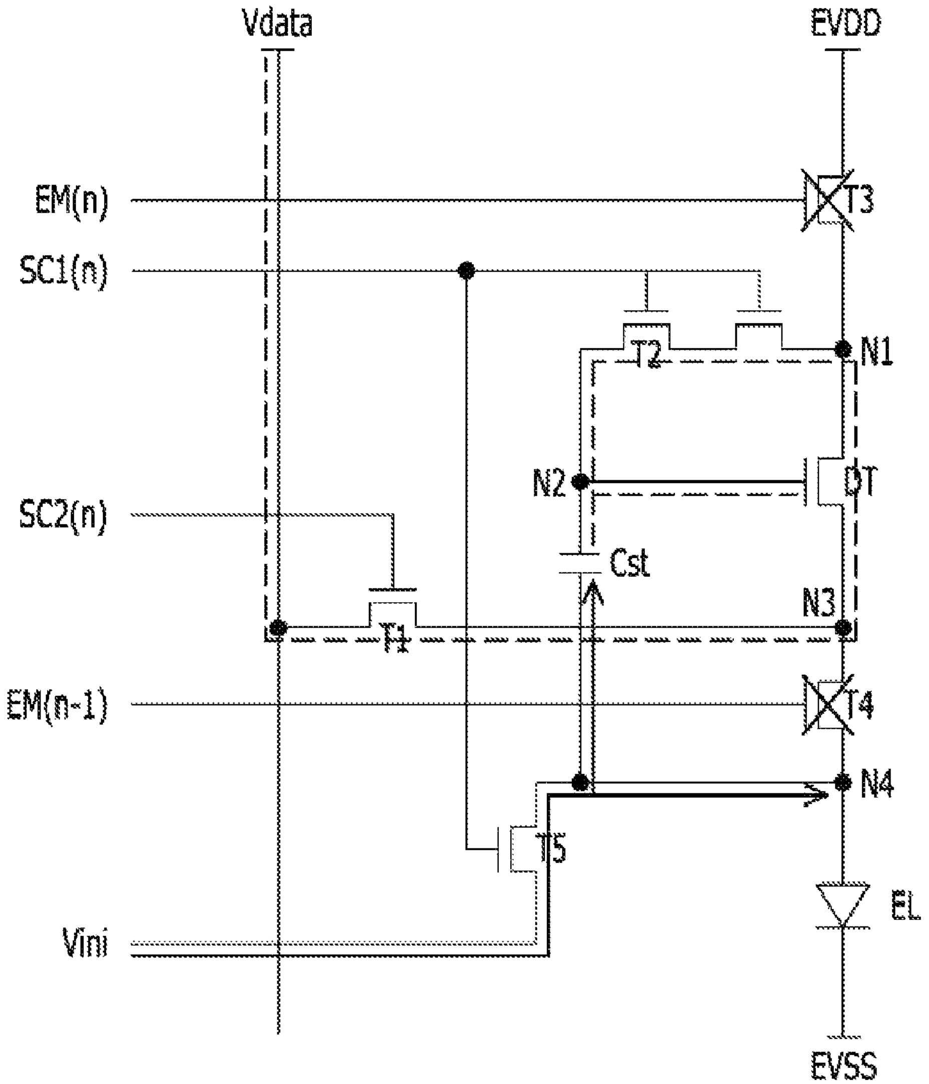

As shown in FIGS. 5 and 6B, the pixel circuit may operate while including the programming and sampling period Program & Sampling.

The programming and sampling period Program & Sampling is a period in which the threshold voltage Vth of the driving transistor DT is sampled, and the data voltage Vdata is programmed.

As the first scan signal SC1(*n*) and the second scan signal SC2(*n*), a high voltage is input. As the first and second emission control signals EM(n) and EM(n−1), a low voltage is input. Accordingly, the first, second, and fifth transistors T1, T2, and T5 are turned on, and the third and fourth transistors T3 and T4 are turned off. As the second transistor T2 is turned on, the second transistor T2 is diode-connected between the first node N1 and the second node N2 and, as such, may sample the threshold voltage Vth of the driving transistor DT.

In addition, the data voltage Vdata is supplied to the third node N3. A voltage Vdata+Vth, which is a sum of the data voltage Vdata and the threshold voltage Vth of the driving transistor DT, is supplied to the second node N2.

Figure 6C:
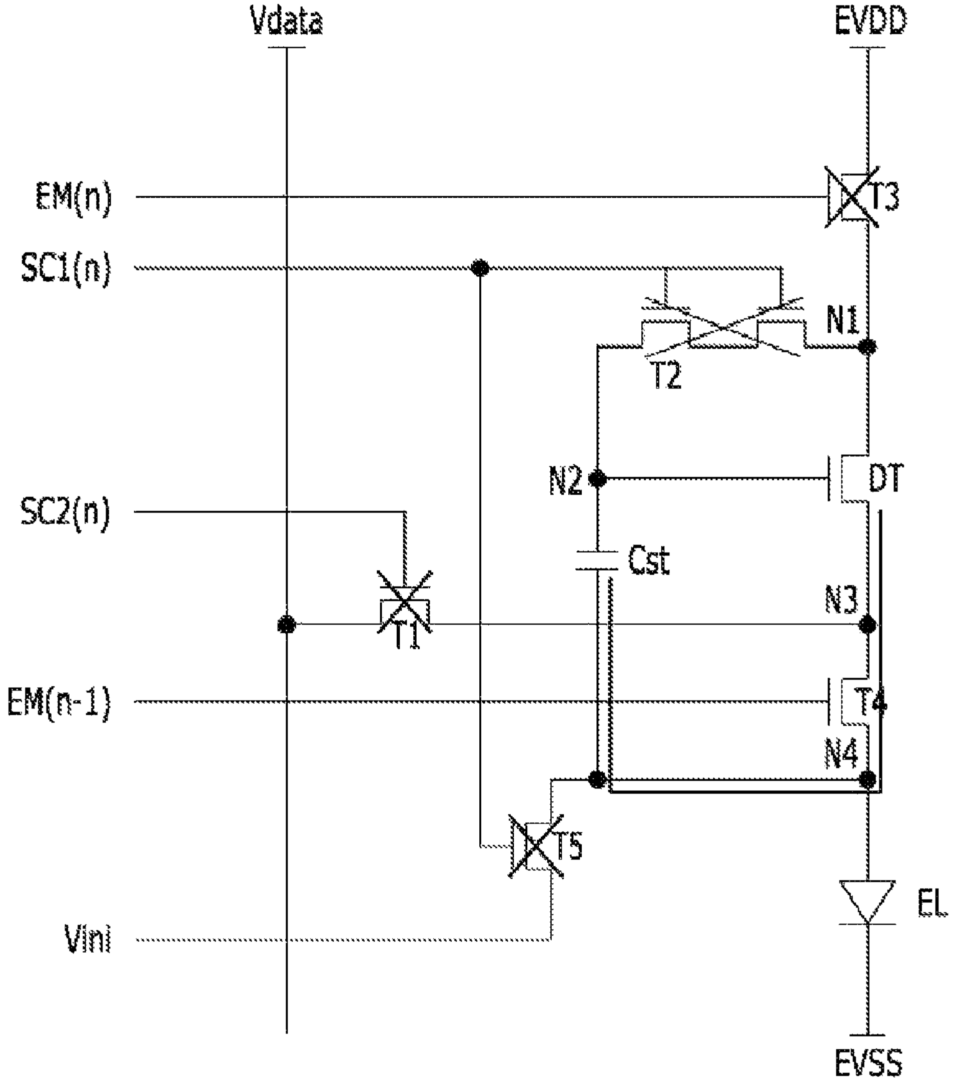

As illustrated in FIGS. 5 and 6C, the pixel circuit may operate while including the holding period Holding.

In the holding period Holding, a low voltage is input as the first scan signal SC1(*n*), the second scan signal SC2(*n*), the first emission control signal EM(n), and the second emission control signal EM(n−1), and a high voltage is subsequently input only as the second emission control signal EM(n−1). Accordingly, only the fourth transistor T4 is turned on, thereby initializing the third node N3 and the fourth node N4. At the second node N2, a voltage Vdata+Vth, which is a sum of the data voltage Vdata and the threshold voltage Vth of the driving transistor DT, is sustained.

Figure 6D:
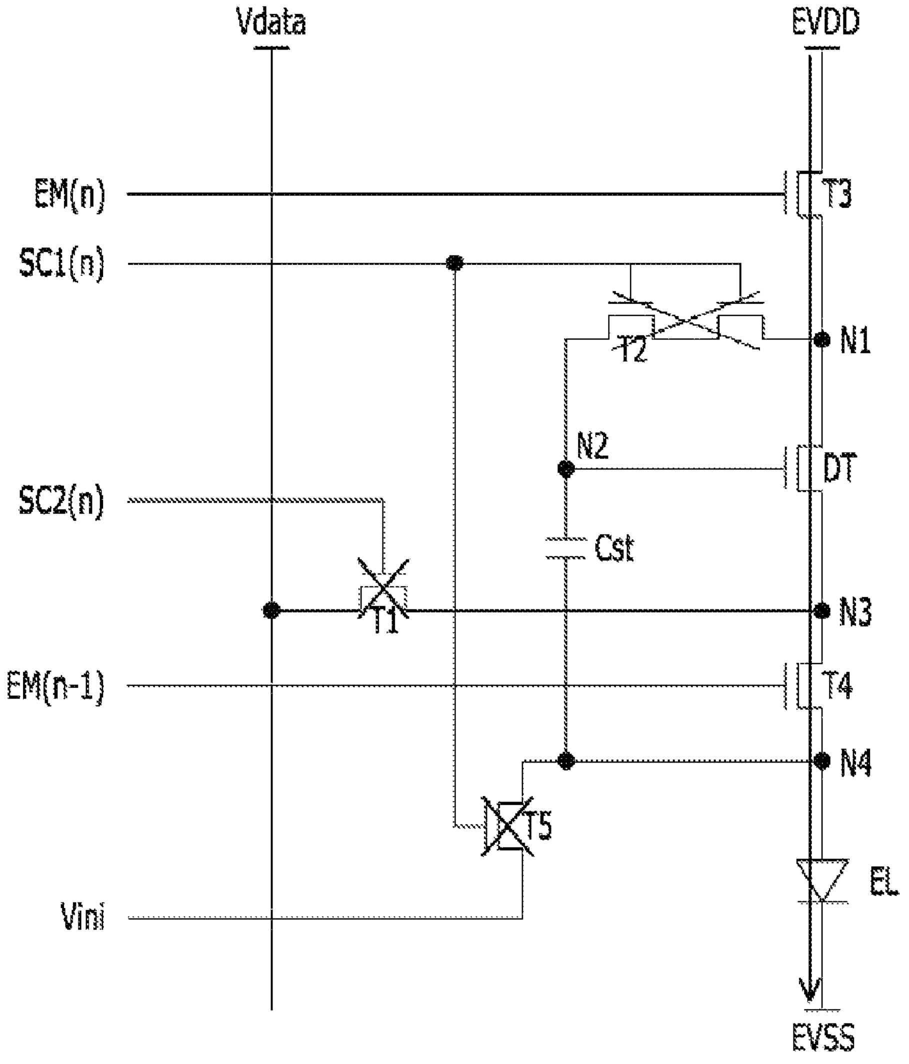

As illustrated in FIGS. 5 and 6D, the pixel circuit may operate while including the emission period Emission.

The emission period Emission is a period in which the sampled threshold voltage Vth is offset, and the light emitting element EL emits light by a drive current corresponding to the data voltage.

The first scan signal SC1(*n*) and the second scan signal SC2(*n*) are input as a low voltage, and the first and second emission control signals EM(n) and EM(N−1) are input as a high voltage. Accordingly, the third and fourth transistors T3 and T4 are turned on.

As the third and fourth transistors T3 and T4 are turned on, the high-level drive voltage EVDD is supplied to the light emitting element EL via the third and fourth transistors T3 and T4 and the driving transistor DT.

Figure 7:
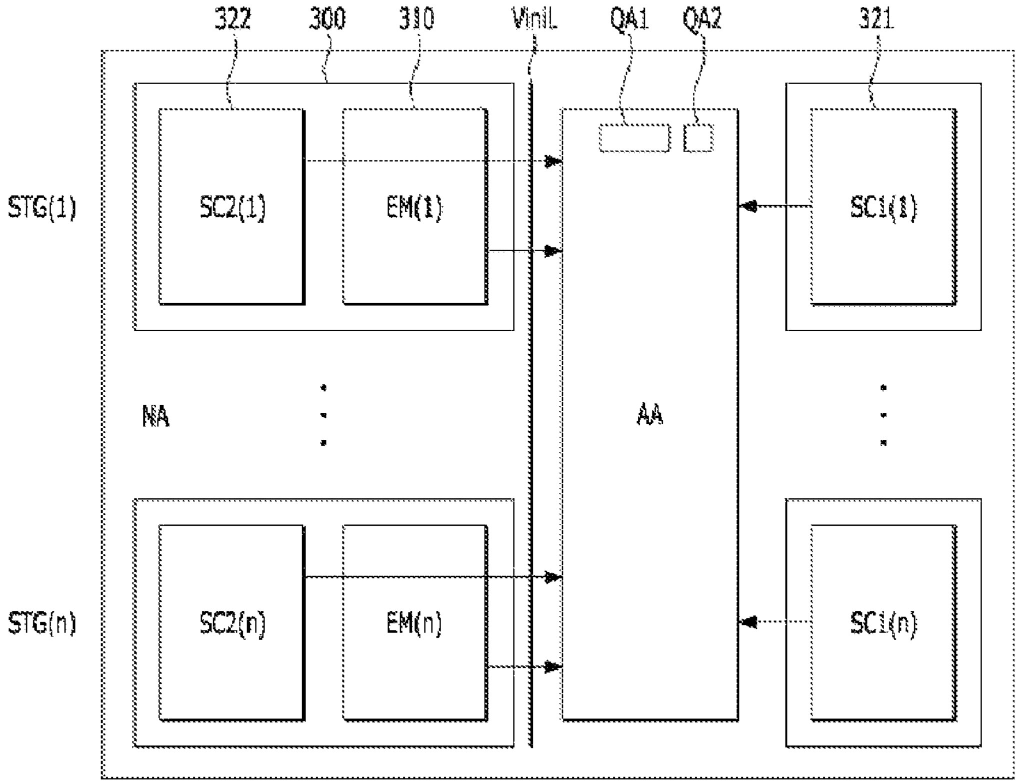
FIG. 7 is a diagram of a configuration of a gate driver in the display device of the present disclosure according to the example configuration of the sub-pixel of FIG. 4.

FIG. 7 is a diagram of a configuration of a gate driver in the display device of the present disclosure according to the configuration of the sub-pixel of FIG. 4.

As shown in FIG. 7, the gate driver, which is designated by reference numeral "300", includes an emission control signal driver 310 and a scan driver 320. The scan driver 320 may be constituted by first and second scan drivers 321 and 322.

The gate driver 300 may include shift registers symmetrically configured at opposite sides of an active area AA, respectively. In addition, the gate driver 300 is configured such that the shift register at one side of the active area AA includes the second scan driver 322 and the emission control signal driver 310, and the shift resister at the other side of the active area AA includes the first scan driver 321. Of course, the present disclosure is not limited to the above-described configuration, and the emission control signal driver 310 and the first and second scan drivers 321 and 322 may be disposed differently from those of the above-described configuration in accordance with an embodiment.

Although the other-side shift register is shown in FIG. 7 as including only the first scan driver 321, the present disclosure is not limited thereto. The other-side shift register may further include the emission control signal driver 310 as well as the first scan driver 321.

In addition, although the second scan driver 322 is shown in FIG. 7 as being disposed farther from the active area AA than the emission control signal driver 310, the present disclosure is not limited thereto. The emission control signal driver 310 may be disposed farther from the active area AA than the second scan driver 322.

In addition, the emission control signal driver 310 and the second scan driver 322 may be symmetrically disposed with reference to the active area AA.

Each shift register may include stages STG1 to STGn, and the stages STG1 to STGn may include respective first scan signal generators SC1(1) to SC1($n$), respective second scan signal generators SC2(1) to SC2($n$), and respective emission control signal generators EM(1) to EM(n).

The first scan signal generators SC1(1) to SC1($n$) output first scan signals SC1(1) to SC1($n$) through first scan lines SCL1 of the display panel 100, respectively. The second scan signal generators SC2(1) to SC2($n$) output second scan signals SC2(1) to SC2($n$) through second scan lines SCL2 of the display panel 100, respectively. The emission control signal generators EM(1) to EM(n) outputs emission control signals EM(1) to EM(n) through emission control lines EML of the display panel 100, respectively.

The first scan signals SC1(1) to SC1($n$) are used as a signal for driving an A-th switching transistor (for example, an initialization transistor or the like) included in the pixel circuit. The second scan signal generators SC2(1) to SC2($n$) may be used as a signal for driving a B-th switching transistor (for example, a data supplying transistor or the like) included in the pixel circuit. The emission control signal generators EM(1) to EM(n) may be used as a signal for driving a C-th switching transistor (for example, an emission control transistor or the like) included in the pixel circuit. For example, when emission control transistors of pixels are controlled using the emission control signals EM(1) to EM(n), emission times of light emitting elements may be varied.

As illustrated in FIG. 7, an initialization voltage bus line ViniL may be disposed between the gate driver 300 and the active area AA. The initialization voltage bus line ViniL may receive an initialization voltage Vini from the power supply 500 and may then supply the initialization voltage Vini to the pixel circuit.

Although the initialization voltage bus line ViniL is shown in FIG. 7 as being disposed only at one side, that is, a left side or a right side, of the active area AA, the present disclosure is not limited thereto. For example, the initialization voltage bus line ViniL may be disposed at opposite sides of the active area AA, and even when the initialization voltage bus line ViniL may be disposed at one side of the active area AA, the position of the initialization voltage bus line ViniL is not limited to the left side or the right side.

As shown in FIG. 7, one or more optical areas OA1 and OA2 may be disposed in the active area AA.

The one or more optical areas OA1 and OA2 may be disposed to overlap with one or more optical electronic devices such as a photographing device such as a camera (an image sensor), sensors such as a proximity sensor and a photoresistor, etc.

The one or more optical areas OA1 and OA2 may be formed with a light transmission structure capable of providing a predetermined transmittance or more, for operation of the optical electronic device. In other words, the number of pixels P per unit area in the one or more optical areas OA1 and OA2 may be smaller than that in a general area in the active area AA, except for the optical areas OA1 and OA2. That is, the resolution of the one or more optical areas OA1 and OA2 may be lower than the resolution in the general area in the active area AA.

The light transmission structure in the one or more optical areas OA1 and OA2 may be configured by patterning a cathode in an area where the pixel P is not disposed. In this case, the cathode, which is patterned, may be removed using a laser. Alternatively, patterning of the cathode may be achieved by selectively forming a cathode using a material such as a cathode deposition preventing layer.

In addition, the light transmission structure in the one or more optical areas OA1 and OA2 may be configured by forming the light emitting element EL and the pixel circuit at the pixel P in such a manner that the light emitting element EL and the pixel circuit are separated from each other. In other words, the light emitting element EL of the pixel P may be disposed on the optical areas OA1 and OA2, a plurality of transistors TFT constituting the pixel circuit may be disposed around the optical areas OA1 and OA2, and the light emitting element EL and the pixel circuit may be electrically interconnected via a transparent metal layer.

Figure 8:
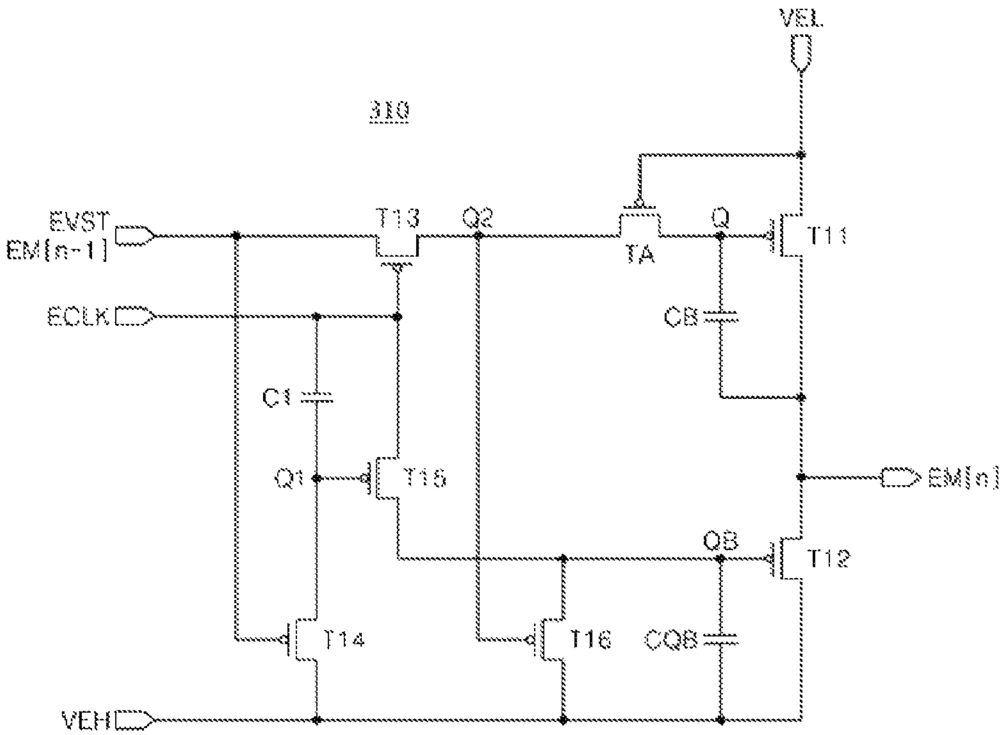
FIG. 8 is an equivalent circuit diagram showing a configuration of an emission control signal driver 310 in the gate driver of the display device according to an embodiment of the present disclosure.

FIG. 8 is an equivalent circuit diagram showing a configuration of an emission control signal driver 310 in the gate driver of the display device according to the embodiment of the present disclosure.

As illustrated in FIG. 8, the emission control signal driver 310 may include a pull-up transistor T11, a pull-down transistor T12, a transfer transistor TA, an eighth transistor T13, a ninth transistor T14, a tenth transistor T15, an eleventh transistor T16, a first capacitor CB, a second capacitor CQB, and a third capacitor C1.

The pull-up transistor T11 may pull-up drive an output terminal EM[n] in response to a signal of a Q-node Q. The pull-down transistor T12 may pull-down drive the output terminal EM[n] in response to a signal of a QB-node QB.

The transfer transistor TA may transfer a charge of a Q2-node Q2 to the Q-node Q in response to a low-level voltage VEL.

The eighth transistor T13 may supply a start signal EVST or an output signal EM[n−1] of an upstream stage to the Q2-node Q2 in response to a clock signal ECLK.

The ninth transistor T14 may transfer a high-level voltage VEH to a Q1-node Q1 in response to the start signal EVST or the output signal EM[n−1] of the upstream stage.

The tenth transistor T15 supplies the clock signal ECLK to the QB-node QB in response to a voltage of the Q1-node Q1.

The eleventh transistor T16 transfers the high-level voltage VEH to the QB-node QB in response to a voltage of the Q2-node Q2.

The first capacitor CB is coupled between the Q-node Q and the output terminal EM[n]. The second capacitor CQB is coupled between the QB-node QB and the high-level voltage VEH. The third capacitor C1 is coupled between the clock signal ECLK and a drain electrode of the transistor T14 and between the clock signal ECLK and a gate electrode of the transistor T15.

Figure 9:
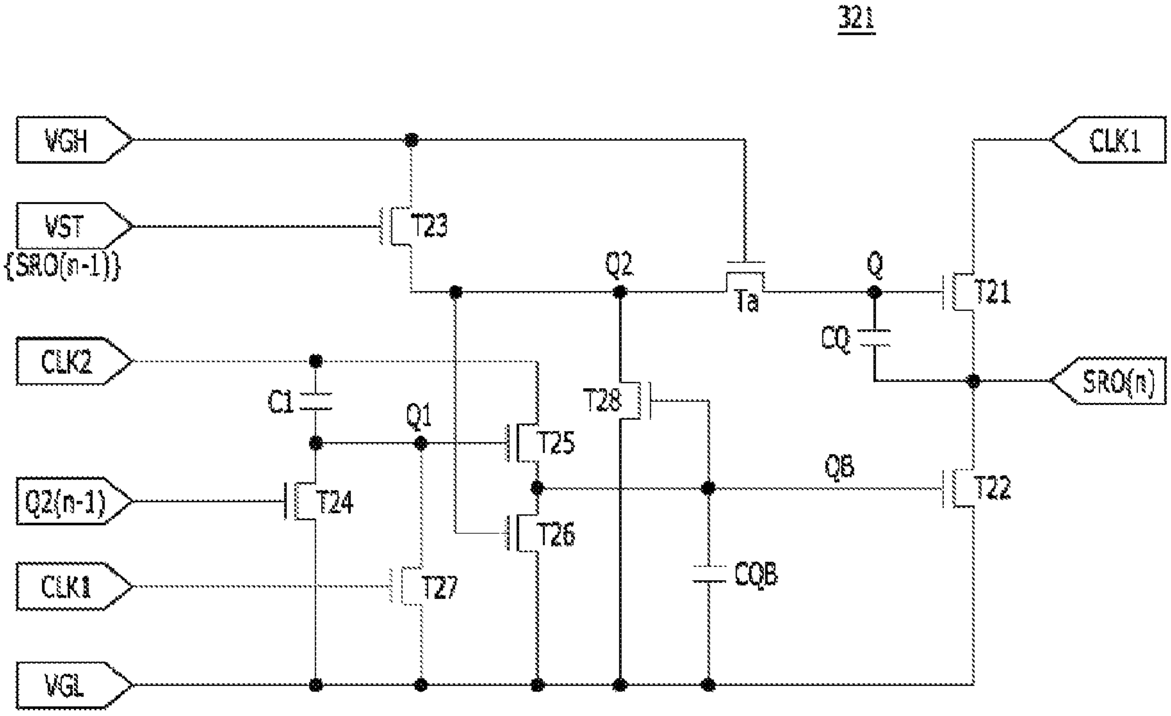
FIG. 9 is an equivalent circuit diagram showing a configuration of a first scan driver 321 in the gate driver of the display device according to an embodiment of the present disclosure.

FIG. 9 is an equivalent circuit diagram showing a configuration of the first scan driver 321 in the gate driver of the display device according to the embodiment of the present disclosure. For convenience of description, FIG. 9 is an equivalent circuit diagram showing a configuration of the first scan driver 321 according to the configuration of the sub-pixel in FIG. 4.

As shown in FIG. 9, the first scan driver 321 may include a pull-up transistor T21, a pull-down transistor T22, a transfer transistor Ta, a twelfth transistor T23, a thirteenth transistor T24, a fourteenth transistor T25, a fifteenth transistor T26, a sixteenth transistor T27, a seventeenth transistor T28, a first capacitor CB, a second capacitor CQB, and a third capacitor C1.

The pull-up transistor T21 may pull-up drive an output terminal SRO[n] in response to a signal of a Q-node Q. The pull-down transistor T22 may pull-down drive the output terminal SRO[n] in response to a signal of a QB-node QB.

The transfer transistor Ta may transfer a charge of a Q2-node Q2 to the Q-node Q in response to a high-level voltage VGH.

The twelfth transistor T23 may supply the high-level voltage VGH to the Q2-node Q2 in response to a start signal VST or an output signal SRO[n−1] of an upstream stage.

The thirteenth transistor T24 may supply a low-level voltage VGL to a Q1-node Q1 in response to a voltage of the Q2-node Q2 of the upstream stage.

The fourteenth transistor T25 supplies a clock signal CLK2 to the QB-node QB in response to a voltage of the Q1-node Q1.

The fifteenth transistor T26 supplies the low-level voltage VGL to the Q1-node Q1 in response to a voltage of the Q2-node Q2.

The sixteenth transistor T27 supplies the low-level voltage VGL to the Q1-node Q1 in response to a clock signal CLK1.

The seventeenth transistor T28 supplies the low-level voltage VGL to the Q2-node Q2 in response to a voltage of the QB-node QB.

The first capacitor CB is coupled between the Q-node Q and the output terminal SRO[n]. The second capacitor CQB is coupled between the QB-node QB and the low-level voltage VGL. The third capacitor C1 is coupled between the clock signal CLK2 and the Q1-node Q1.

The first scan driver 321 described with reference to FIG. 9 is configured in accordance with the configuration of the sub-pixel of FIG. 4 and, as such, outputs a start signal two times to output a first scan signal two times for one frame. In addition, the first scan driver 321 is configured such that opposite voltages are applied to the Q-node Q and the QB-node QB, respectively. That is, when the high-level voltage VGH is applied to the Q-node Q, the low-level voltage VGL is applied to the QB-node QB, whereas, when the low-level voltage VGL is applied to the Q-node Q, the high-level voltage VGH is applied to the QB-node QB.

In addition, the first scan driver 321 described with reference to FIG. 9 is configured to control voltages of the Q-node Q and the QB-node QB as the fourteenth transistor T25, the fifteenth transistor T26, and the seventeenth transistor T28 are sequentially turned on/off.

Figure 10:
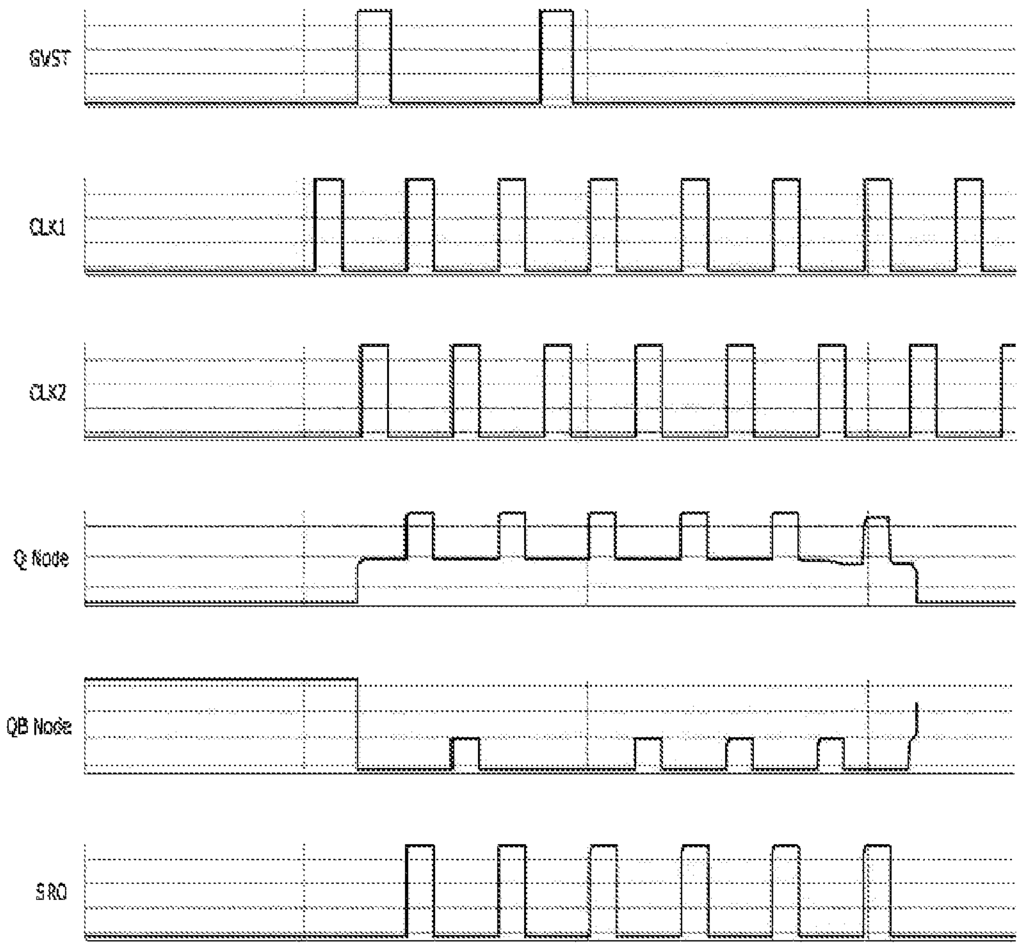
FIG. 10 is a waveform diagram explaining the case in which the scan driver of FIG. 9 outputs multi-scan signals due to threshold voltage (Vth) shift of thin film transistors constituting the scan driver.

FIG. 10 is a waveform diagram explaining the case in which the scan driver of FIG. 9 outputs multi-scan signals due to threshold voltage (Vth) shift of the thin film transistors constituting the scan driver.

As shown in FIG. 10, when a start signal VST is input at a high level, the transfer transistor Ta is turned on, thereby supplying the high-level voltage VGH to the Q-node Q, and the fifteenth transistor T26 is turned on, thereby the low-level voltage VGL to the QB-node QB. As a result, the Q-node Q is in a state of the high-level voltage VGH, and the QB-node QB is in a state of the low-level voltage VGL.

Then, the pull-up transistor T21 is turned on, and is then bootstrapped by the clock signal CLK1 and, as such, the clock signal CLK1 is output as a scan signal SRO[n].

Thereafter, when the start signal VST is input at a low level, the clock signal CLK1 is input at a low level, and the clock signal CLK2 is input at a high level, the fourteenth transistor T25 is turned on, thereby supplying the clock signal CLK2 of the high level to the QB-node QB. At this time, the fifteenth transistor T26 is also turned on, thereby supplying the low-level voltage VGL to the QB-node QB. Accordingly, an abnormal signal caused by short of the clock signal CLK2 and the low-level voltage VGL is applied to the QB-node QB. That is, a voltage higher than the low-level voltage VGL, but lower than the high-level voltage VGH, is sustained at the QB-node QB.

The voltage of the QB-node QB higher than the low-level voltage VGL, but lower than the high-level voltage VGH, corresponds to the threshold voltage Vth of the seventeenth transistor T28. The seventeenth transistor T28 may have a threshold voltage Vth relatively lower than those of the remaining transistors.

When the seventeenth transistor T28 is normal in this state, the seventeenth transistor T28 is turned on, thereby supplying the low-level voltage VGL to the Q-node Q. In addition, the fifteenth transistor T26 is also turned off. Accordingly, the Q-node Q sustains the low-level voltage VGL, and the QB-node QB sustains the high-level voltage VGH.

However, when the threshold voltage Vth of the seventeenth transistor T28 is shifted in a positive direction, the threshold voltage Vth rises to be higher than a voltage higher than the low-level voltage VGL of the QB-node QB, but lower than the high-level voltage VGH. As a result, the seventeenth transistor T28 is turned off. Accordingly, the seventeenth transistor T28 cannot supply the low-level voltage VGL and, as such, the Q-node Q sustains the high-level voltage VGH.

Subsequently, when the clock signal CLK2 is input at a low level, and the clock signal CLK1 is again input at a high level, the pull-up transistor T21 is turned on because the Q-node Q sustains the high-level voltage VGH. The pull-up transistor T21 is then bootstrapped by the clock signal CLK1 and, as such, the clock signal CLK1 is output as the scan signal SRO[n] which is unnecessary.

Accordingly, for one frame, three or more scan signals (multi-scan signals) may be output, in place of two scan signals. For this reason, the display device may not be normally driven.

Figure 11:
FIG. 11 is a waveform diagram explaining an example case in which the scan driver of FIG. 9 outputs multi-scan signals according to a threshold voltage Vth of a seventeenth thin film transistor T28.

FIG. 11 is a waveform diagram explaining the case in which the scan driver of FIG. 9 outputs multi-scan signals according to the threshold voltage Vth of the seventeenth thin film transistor T28.

As illustrated in FIG. 11, it may be seen that, when the threshold voltage Vth of the seventeenth transistor T28 is normal without being shifted (when the threshold voltage Vth of the seventeenth transistor T28 is 3.2 V or less), one scan signal SRO is normally output for one frame.

On the other hand, it may also be seen that, when the threshold voltage Vth of the seventeenth transistor T28 is shifted in a positive direction, to be raised, three or more scan signals SRO are output for one frame.

Therefore, technology for preventing threshold voltage shift of the thin film transistors from influencing an output of the gate driver is needed.

Figure 12:
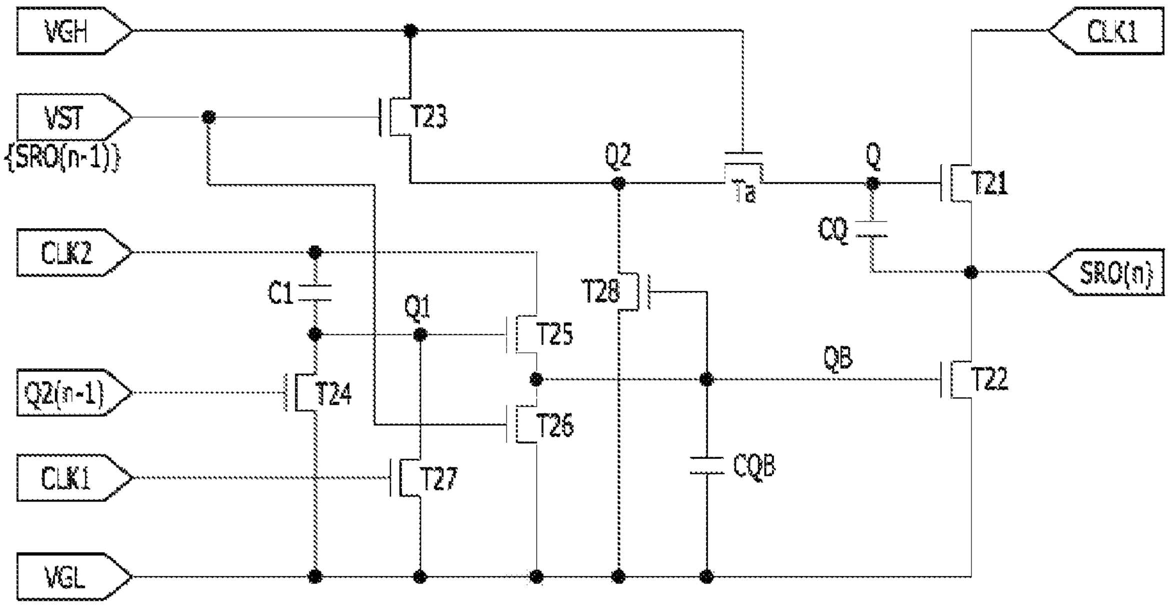
FIG. 12 is an equivalent circuit diagram showing a configuration of a first scan driver 321 in a gate driver of a display device according to another embodiment of the present disclosure.

FIG. 12 is an equivalent circuit diagram showing a configuration of a first scan driver 321 in a gate driver of a display device according to another embodiment of the present disclosure.

The second scan driver 322 described with reference to FIG. 7 may have an equivalent circuit identical to or different from that of the first scan driver 321 described with reference to FIG. 12.

As shown in FIG. 12, the first scan driver 321 may include a pull-up transistor T21, a pull-down transistor T22, a transfer transistor Ta, a twelfth transistor T23, a thirteenth transistor T24, a fourteenth transistor T25, a fifteenth transistor T26, a sixteenth transistor T27, a seventeenth transistor T28, a first capacitor CB, a second capacitor CQB, and a third capacitor C1.

The pull-up transistor T21 may pull-up drive an output terminal SRO[n] in response to a signal of a Q-node Q. The pull-down transistor T22 may pull-down drive the output terminal SRO[n] in response to a signal of a QB-node QB.

The pull-up transistor T21 and the pull-down transistor T22 may be referred to as an "output buffer".

The transfer transistor Ta transfers a charge of a Q2-node Q2 to the Q-node Q in response to a high-level voltage VGH.

The twelfth transistor T23 supplies the high-level voltage VGH to the Q2-node Q2 in response to a start signal VST or an output signal SRO[n−1] of an upstream stage.

The thirteenth transistor T24 supplies a low-level voltage VGL to a Q1-node Q1 in response to a voltage of the Q2-node Q2 of the upstream stage.

The fourteenth transistor T25 supplies a clock signal CLK2 to the QB-node QB in response to a voltage of the Q1-node Q1.

The fifteenth transistor T26 supplies the low-level voltage VGL to the QB-node QB in response to the start signal VST or the output signal SRO[n−1] of the upstream stage.

The sixteenth transistor T27 supplies the low-level voltage VGL to the Q1-node Q1 in response to the clock signal CLK1.

The seventeenth transistor T28 supplies the low-level voltage VGL to the Q2-node Q2 in response to a voltage of the QB-node QB.

The first capacitor CB is coupled between the Q-node Q and the output terminal SRO[n]. The second capacitor CQB is coupled between the QB-node QB and the low-level voltage VGL. The third capacitor C1 is coupled between the clock signal CLK2 and the Q1-node Q1.

Figure 13:
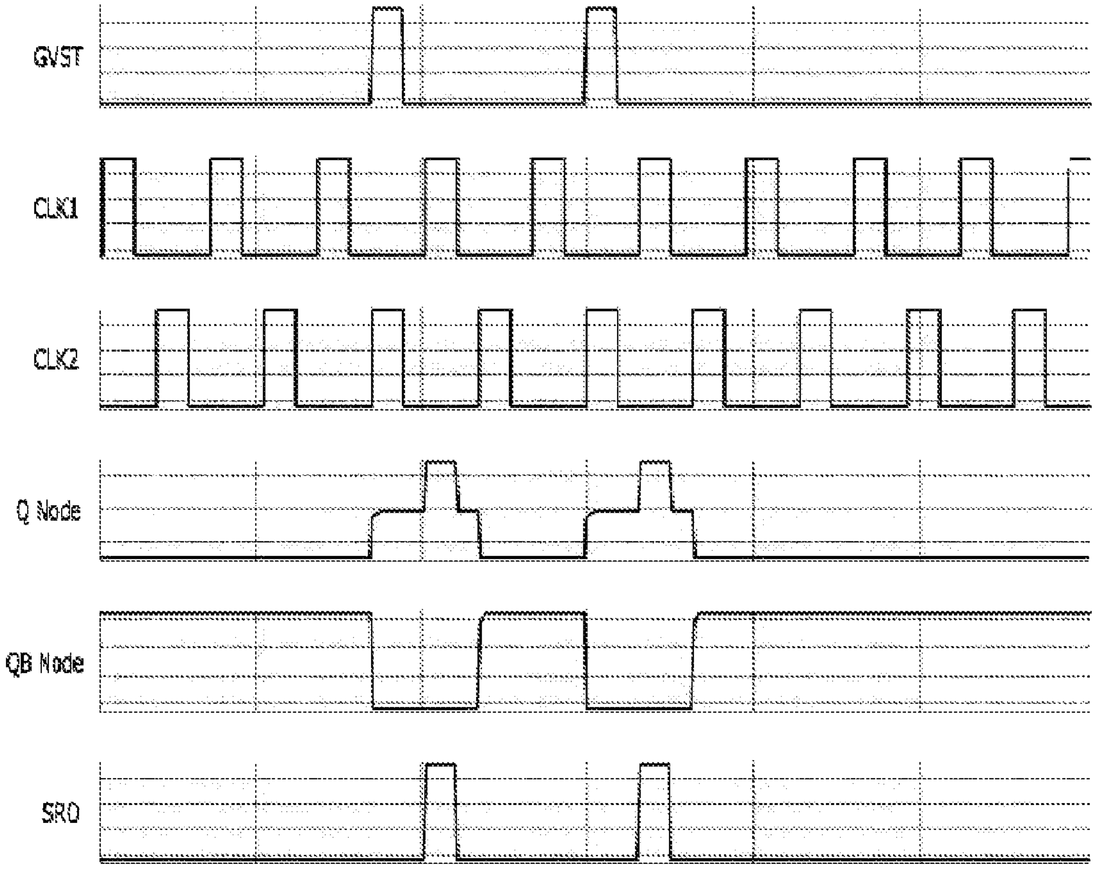
FIG. 13 is a waveform diagram explaining an example case in which the scan driver of FIG. 12 normally outputs a scan signal even when threshold voltages Vth of thin film transistors constituting the scan driver are shifted.

FIG. 13 is a waveform diagram explaining the case in which the scan driver of FIG. 12 normally outputs a scan signal even when threshold voltages Vth of the thin film transistors constituting the scan driver are shifted.

The first scan driver 321 described with reference to FIG. 12 has a configuration according to the configuration of the sub-pixel of FIG. 4 and, as such, a start signal is output two times to enable the first scan driver 321 to output a first scan signal two times for one frame.

In addition, the first scan driver 321 is configured such that opposite voltages are applied to the Q-node Q and the QB-node QB, respectively. That is, when the high-level voltage VGH is applied to the Q-node Q, the low-level voltage VGL is applied to the QB-node QB, whereas, when the low-level voltage VGL is applied to the Q-node Q, the high-level voltage VGH is applied to the QB-node QB.

In addition, the first scan driver 321 described with reference to FIG. 12 is configured to control voltages of the Q-node Q and the QB-node QB as the fourteenth transistor T25, the fifteenth transistor T26, and the seventeenth transistor T28 are sequentially turned on/off.

As illustrated in FIG. 13, when a start signal VST is input at a high level, the transfer transistor Ta is turned on, thereby supplying the high-level voltage VGH to the Q-node Q, and the fifteenth transistor T26 is turned on, thereby the low-level voltage VGL to the QB-node QB. As a result, the Q-node Q is in a state of the high-level voltage VGH, and the QB-node QB is in a state of the low-level voltage VGL.

Then, the pull-up transistor T21 is turned on, and is then bootstrapped by the clock signal CLK1 and, as such, the clock signal CLK1 is output as a scan signal SRO[n].

Thereafter, when the start signal VST is input at a low level, the clock signal CLK1 is input at a low level, and the clock signal CLK2 is input at a high level, the fourteenth transistor T25 is turned on, thereby supplying the clock signal CLK2 of the high level to the QB-node QB. At this time, the fifteenth transistor T26 is also turned on, thereby supplying the low-level voltage VGL to the QB-node QB.

Accordingly, an abnormal signal caused by short of the clock signal CLK2 and the low-level voltage VGL is not applied to the QB-node QB, but the high-level voltage VGH corresponding to the clock signal CLK2 of the high level is supplied to the QB-node QB.

In addition, even when the threshold voltage Vth of the seventeenth transistor T28 rises in accordance with shift thereof in a positive direction, the seventeenth transistor T28 is turned on because the QB-node QB sustains the high-level voltage VGH. Accordingly, the low-level voltage VGL is supplied to the Q-node Q.

Even when the threshold voltage Vth of the seventeenth transistor T28 rises to 5.0 V in accordance with shift thereof in the positive direction, the seventeenth transistor T28 is turned on, thereby supplying the low-level voltage VGL to the Q-node Q.

Subsequently, even when the clock signal CLK2 is input at a low level, and the clock signal CLK1 is input at a high level, the clock signal CLK1 is not output as the scan signal SRO[n] because the Q-node Q sustains the low-level voltage VGL.

Accordingly, the start signal VST is applied to the gate electrode of the fifteenth transistor T26 and, as such, it may be possible to prevent an unnecessary scan pulse from being output even when the threshold voltage Vth of the seventeenth transistor T28 is shifted in the positive direction.

Figure 14:
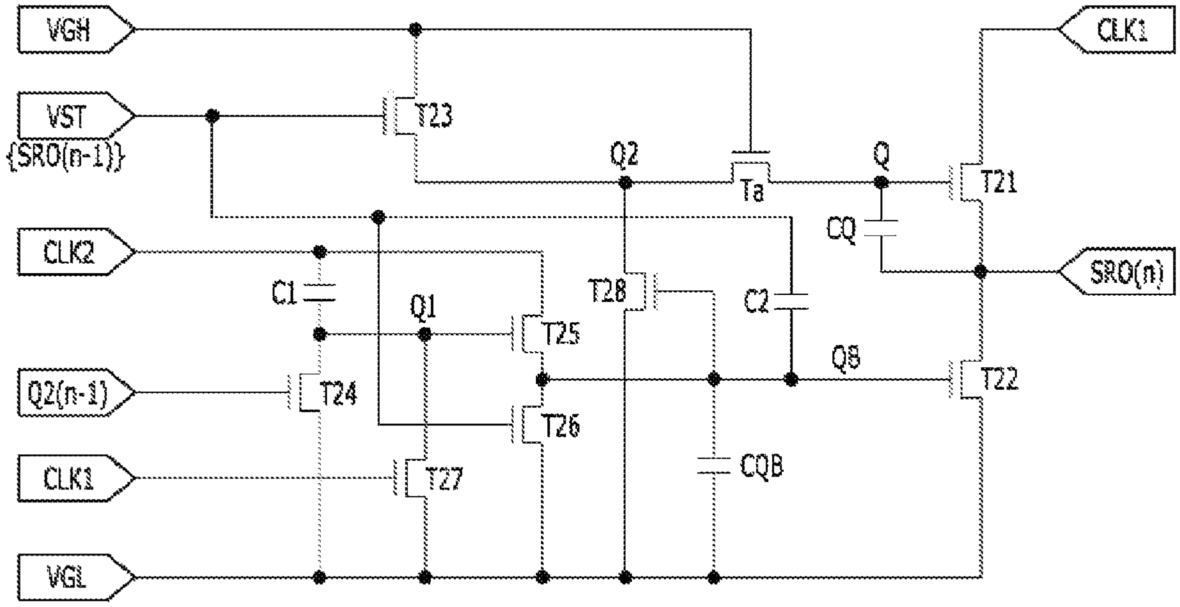
FIG. 14 is an equivalent circuit diagram showing a configuration of a first scan driver 321 in a gate driver of a display device according to another embodiment of the present disclosure.
Figure 15:
FIG. 15 is a waveform diagram explaining an example case in which the scan driver of FIG. 14 normally outputs a scan signal even when threshold voltages Vth of thin film transistors constituting the scan driver are shifted.

FIG. 14 is an equivalent circuit diagram showing a configuration of a first scan driver 321 in a gate driver of a display device according to another embodiment of the present disclosure. FIG. 15 is a waveform diagram explaining the case in which the scan driver of FIG. 14 normally outputs a scan signal even when threshold voltages Vth of the thin film transistors constituting the scan driver are shifted.

The configuration of the first scan driver 321 of FIG. 14 is identical to the configuration of the scan driver 321 described with reference to FIG. 12, except for a fourth capacitor C2. Accordingly, no description will be given of the remaining configuration of the first scan driver 321 of FIG. 14.

The configuration of the first scan driver 321 according to the embodiment of FIG. 14 includes addition of the fourth capacitor C2 between the QB-node QB and a supply line for the start signal VST or the scan signal SRO(n−1) of the upstream stage to the configuration of the scan driver 321 described with reference to FIG. 12.

As shown in FIG. 15, it may be possible to stably maintain the QB-node QB at a low level in a low-level period of the start signal VST using kick-back when the start signal VST transitions to a high/low level because the fourth capacitor C2 is added.

Figure 16:
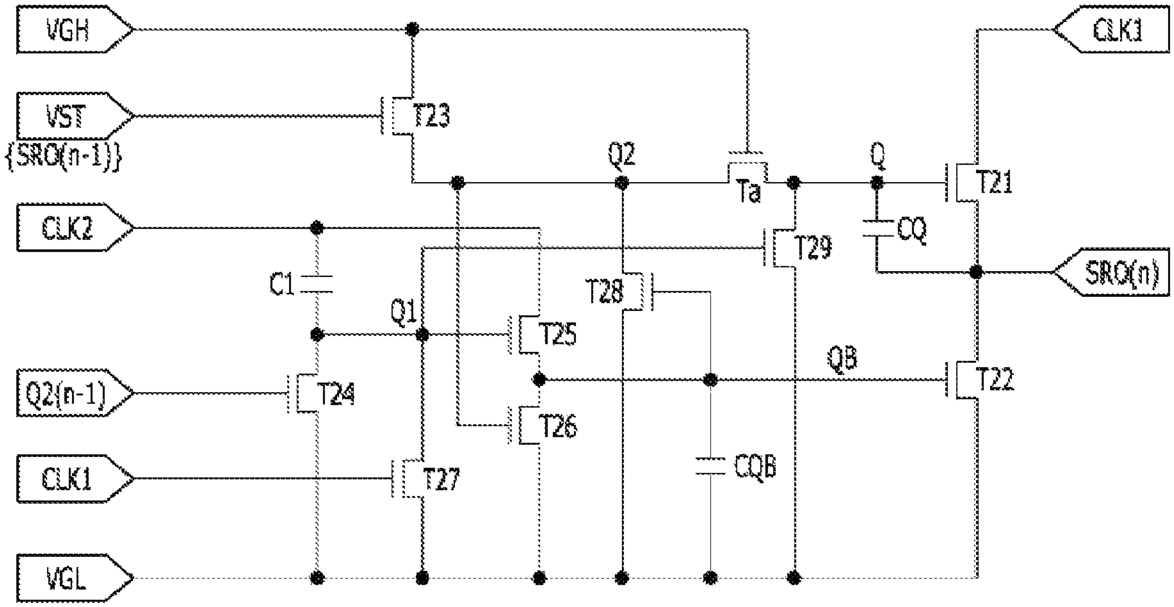
FIG. 16 is an equivalent circuit diagram showing a configuration of a first scan driver 321 in a gate driver of a display device according to another embodiment of the present disclosure.
Figure 17:
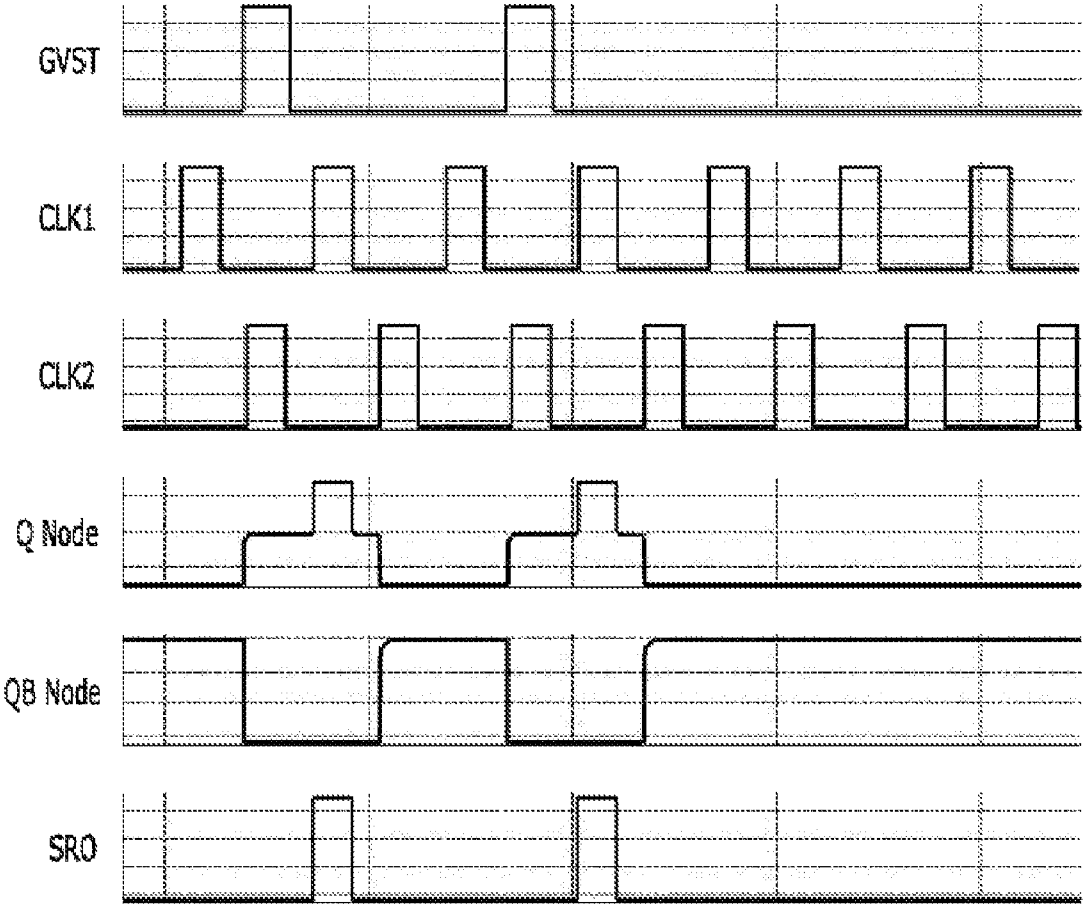
FIG. 17 is a waveform diagram explaining an example case in which the scan driver of FIG. 16 normally outputs a scan signal even when threshold voltages Vth of thin film transistors constituting the scan driver are shifted.

FIG. 16 is an equivalent circuit diagram showing a configuration of a first scan driver 321 in a gate driver of a display device according to another embodiment of the present disclosure. FIG. 17 is a waveform diagram explaining the case in which the scan driver of FIG. 16 normally outputs a scan signal even when threshold voltages Vth of the thin film transistors constituting the scan driver are shifted.

The configuration of the first scan driver 321 of FIG. 16 is identical to the configuration of the scan driver 321 described with reference to FIG. 9, except for an eighteenth transistor T29. Accordingly, no description will be given of the remaining configuration of the first scan driver 321 of FIG. 16.

The configuration of the first scan driver 321 according to the embodiment of FIG. 16 includes addition of the eighteenth transistor T29 between the Q-node Q and a supply line for the low-level voltage VGL to the configuration of the scan driver 321 described with reference to FIG. 9.

The eighteenth transistor T29 supplies the low-level voltage VGL to the Q-node Q in response to a voltage of the Q1-node Q1.

As illustrated in FIGS. 16 and 17, when the start signal VST is input at a high level, the transfer transistor Ta is turned on, thereby supplying the high-level voltage VGH to the Q-node Q, and the fifteenth transistor T26 is also turned on, thereby supplying the low-level voltage VGL to the QB-node QB. Accordingly, the Q-node Q is in a state of the high-level voltage VGH, and the QB-node QB is in a state of the low-level voltage VGL.

In addition, the pull-up transistor T21 is turned on, and is then bootstrapped by the clock signal CLK1 and, as such, the clock signal CLK1 is output as the scan signal SRO[n].

Subsequently, when the start signal VST is input at a low level, the clock signal CLK1 is input at a low level, and the clock signal CLK2 is input at a high level, the fourteenth transistor T25 is turned on and, as such, the clock signal CLK2, which is a high level, is supplied to the QB-node QB. In this state, the fifteenth transistor T26 is also turned on, thereby supplying the low-level voltage VGL to the QB-node QB. Accordingly, an abnormal signal caused by short of the clock signal CLK2 and the low-level voltage VGL is applied to the QB-node QB. That is, the QB-node QB sustains a voltage higher than the low-level voltage VGL, but lower than the high-level voltage VGH.

When the seventeenth transistor T28 is normal in this state, the seventeenth transistor T28 is turned on, thereby supplying the low-level voltage VGL to the Q-node Q. In addition, the fifteenth transistor T26 is turned off. Accordingly, the Q-node Q sustains a low-level voltage VGL, and the QB-node QB sustains the high-level voltage VGH.

When the threshold voltage Vth of the seventeenth transistor T28 is shifted in a positive direction, the threshold voltage Vth of the seventeenth transistor T28 rises to be higher than a voltage higher than the low-level voltage VGL of the QB-node QB, but lower than the high-level voltage VGH. As a result, the seventeenth transistor T28 is turned off. Accordingly, the seventeenth transistor T28 cannot supply the low-level voltage VGL and, as such, the Q-node Q sustains the high-level voltage VGH.

However, when the clock signal CLK2 is input at a high level, the eighteenth transistor T29 is turned on, thereby supplying the low-level voltage VGL to the Q-node Q. In addition, as the low-level voltage VGL is supplied to the Q-node Q through the eighteenth transistor T29, the fifteenth transistor T26 is also turned off, thereby causing the QB-node QB to sustain the high-level voltage VGH.

Accordingly, an abnormal signal caused by short of the clock signal CLK2 and the low-level voltage VGL is not applied to the QB-node QB. In place, the high-level voltage VGH corresponding to the clock signal CLK2 of the high level is supplied to the QB-node QB.

In addition, it may be possible to prevent an unnecessary scan pulse from being output even when the threshold voltage Vth of the seventeenth transistor T28 is shifted in the positive direction.

As apparent from the above description, the display device including the gate driver according to each of the embodiments of the present disclosure provides the following effects.

In accordance with the embodiment, a low-level voltage is supplied to a QB-node in response to a start signal or a scan signal of an upstream stage, or a low-level voltage is supplied to a Q-node in response to a second clock signal. Accordingly, an abnormal signal caused by short of the second clock signal and the low-level signal is not applied to the QB-node. In place, a high-level voltage corresponding to the second clock signal is supplied to the QB-node.

Accordingly, it may be possible to prevent shift of threshold voltages of thin film transistors constituting the gate driver from influencing an output of the gate driver.

Effects of the present disclosure are not limited to the above-described effects. Other effects not described in the present disclosure may be readily understood by those skilled in the art from the appended claims.

Although the foregoing description has been given mainly in conjunction with embodiments, these embodiments are only illustrative without limiting the disclosure. Those skilled in the art to which the present disclosure pertains can appreciate that various modifications and applications illustrated in the foregoing description may be possible without changing essential characteristics of the embodiments. Therefore, the above-described embodiments should be understood as exemplary rather than limiting in all aspects. In addition, the scope of the present disclosure should also be interpreted by the claims below rather than the above detailed description. All modifications or alterations as would be derived from the equivalent concept intended to be included within the scope of the present disclosure should also be interpreted as falling within the scope of the disclosure.

What is claimed is:

1. A display device, comprising:

a display panel comprising a plurality of gate lines and a plurality of data lines; and a gate driver comprising a plurality of scan drivers, the gate driver being configured to sequentially output a scan signal to the plurality of gate lines, wherein one of the plurality of scan drivers comprises:

an output buffer configured to output a first clock signal as a scan signal in response to signals of a Q-node and a QB-node;

a first transistor configured to supply a low-level voltage to the QB-node in response to a start signal or a scan signal of an upstream scan driver of the plurality of scan drivers, wherein the one of the plurality of scan drivers immediately follows the upstream scan driver;

a second transistor configured to supply a high-level voltage to a Q2-node and the Q-node in response to the start signal or the scan signal of the upstream scan driver; and a third transistor configured to supply the low-level voltage to a Q1-node in response to a voltage of a Q2-node in the upstream scan driver.

2. The display device according to claim 1, wherein the one of the plurality of scan drivers further comprises:

a fourth transistor configured to supply a second clock signal to the QB-node in response to a voltage of the Q1-node;

a fifth transistor configured to supply the low-level voltage to the Q1-node in response to the first clock signal; and a sixth transistor configured to supply the low-level voltage to the Q2-node in response to a voltage of the QB-node.

3. The display device according to claim 2, wherein the one of the plurality of scan drivers further comprises:

a transfer transistor configured to transfer a voltage of the Q2-node to the Q-node in response to the high-level voltage.

4. The display device according to claim 2, wherein the one of the plurality of scan drivers further comprises:

a first capacitor coupled between the Q-node and an output terminal of the output buffer;

a second capacitor coupled between the QB-node and a supply line for the low-level voltage; and a third capacitor coupled between a supply line for the second clock signal and the Q1-node.

5. A display device, comprising:

a display panel comprising a plurality of gate lines and a plurality of data lines; and a gate driver comprising a plurality of scan drivers, the gate driver being configured to sequentially output a scan signal to the plurality of gate lines, wherein one of the plurality of scan drivers comprises:

an output buffer configured to output a first clock signal as a scan signal in response to signals of a Q-node and a QB-node;

a first transistor configured to supply a low-level voltage to the QB-node in response to a start signal or a scan signal of an upstream scan driver of the plurality of scan drivers, wherein the one of the plurality of scan drivers immediately follows the upstream scan driver; and a first capacitor directly coupled between the QB-node and a supply line for the start signal or the scan signal of the upstream scan driver.

6. The display device according to claim 5, wherein the one of the plurality of scan drivers further comprises:

a second transistor configured to supply a high-level voltage to a Q2-node and the Q-node in response to the start signal or the scan signal of the upstream scan driver;

a third transistor configured to supply the low-level voltage to a Q1-node in response to a voltage of a Q2-node in the upstream scan driver;

a fourth transistor configured to supply a second clock signal to the QB-node in response to a voltage of the Q1-node;

a fifth transistor configured to supply the low-level voltage to the Q1-node in response to the first clock signal; and a sixth transistor configured to supply the low-level voltage to the Q2-node in response to a voltage of the QB-node.

7. The display device according to claim 6, wherein the one of the plurality of scan drivers further comprises:

a transfer transistor configured to transfer a voltage of the Q2-node to the Q-node in response to the high-level voltage.

8. The display device according to claim 6, wherein the one of the plurality of scan drivers further comprises:

a second capacitor coupled between the Q-node and an output terminal of the output buffer;

a third capacitor coupled between the QB-node and a supply line for the low-level voltage; and a fourth capacitor coupled between a supply line for the second clock signal and the Q1-node.

* * * * *